(12) United States Patent
Schmitt et al.

(10) Patent No.: US 11,278,962 B2
(45) Date of Patent: Mar. 22, 2022

(54) PRESS FOR PRODUCING DIMENSIONALLY STABLE PREFORMS AND PRODUCTION PROCESS

(71) Applicant: GKN Sinter Metals Engineering GmbH, Radevormwald (DE)

(72) Inventors: Rainer Schmitt, Bonn (DE); Ümit Aydin, Wachtberg (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 271 days.

(21) Appl. No.: 15/126,769

(22) PCT Filed: Mar. 18, 2015

(86) PCT No.: PCT/EP2015/055719
§ 371 (c)(1),
(2) Date: Sep. 16, 2016

(87) PCT Pub. No.: WO2015/140228
PCT Pub. Date: Sep. 24, 2015

(65) Prior Publication Data
US 2017/0087638 A1    Mar. 30, 2017

(30) Foreign Application Priority Data

Mar. 18, 2014   (DE) ............... 10 2014 003 726.6

(51) Int. Cl.
*B22F 5/00*      (2006.01)
*B22F 3/03*      (2006.01)
(Continued)

(52) U.S. Cl.
CPC ............. *B22F 5/00* (2013.01); *B22F 3/004* (2013.01); *B22F 3/03* (2013.01); *B28B 3/083* (2013.01);
(Continued)

(58) Field of Classification Search
CPC .......................................... B22F 5/00
See application file for complete search history.

(56) References Cited

U.S. PATENT DOCUMENTS 3,444,719 A * 5/1969 Roehrs ................ B21D 37/10
                                                            72/462
RE27,958 E * 4/1974 Vinson .................. B30B 11/04
                                                            74/568 R
(Continued)

FOREIGN PATENT DOCUMENTS

CN   201333797 Y    10/2009
DE      2834226 A1   2/1980
(Continued)

OTHER PUBLICATIONS

English Machine translation of DE 2834226. (Year: 1980).*

(Continued)

*Primary Examiner* — Megan McCulley
(74) *Attorney, Agent, or Firm* — Quarles & Brady LLP

(57) ABSTRACT

The invention relates to a press for producing dimensionally stable preforms from material that is substantially in the form of a powder, in particular iron powder and or ceramic powder, with a tool comprising an upper die and a lower die, wherein the upper die and the lower die respectively comprise at least one die, wherein a first die and a second die are arranged together, one sliding in the other, as the upper die or lower die and respectively have a first end and a second end, lying opposite the first end, wherein at least one of the two dies spreads out along one portion to such an extent that the second end thereof has a width that at least approaches an outer diameter of a die holder associated with the second end. This allows presses of a compact form to be made available for producing dimensionally stable preforms of high quality and great complexity.

18 Claims, 17 Drawing Sheets

(51) Int. Cl.
  *B30B 11/02*    (2006.01)
  *B28B 3/08*     (2006.01)
  *B30B 15/06*    (2006.01)
  *B22F 3/00*     (2021.01)
  *B22F 10/10*    (2021.01)
  *B33Y 10/00*    (2015.01)
  *B33Y 80/00*    (2015.01)

(52) U.S. Cl.
  CPC ............ *B30B 11/02* (2013.01); *B30B 15/065* (2013.01); *B22F 10/10* (2021.01); *B22F 2003/033* (2013.01); *B22F 2301/35* (2013.01); *B22F 2998/10* (2013.01); *B33Y 10/00* (2014.12); *B33Y 80/00* (2014.12); *C04B 2235/604* (2013.01); *Y02P 10/25* (2015.11)

(56) References Cited

U.S. PATENT DOCUMENTS

| | | | | |
|---|---|---|---|---|
| 4,714,420 | A * | 12/1987 | Milisavljevic | B28B 5/08 425/161 |
| 5,238,375 | A * | 8/1993 | Hirai | B30B 11/02 100/237 |
| 5,409,662 | A * | 4/1995 | Hirai | B30B 11/26 419/67 |
| 5,498,147 | A | 3/1996 | Katagiri et al. | |
| 5,686,128 | A * | 11/1997 | Tracy | B29C 48/09 426/284 |
| 5,698,149 | A * | 12/1997 | Hinzmann | B22F 3/03 264/120 |
| 6,029,486 | A * | 2/2000 | Haraga | B21D 22/10 72/465.1 |
| 6,165,400 | A * | 12/2000 | Hinzmann | B21K 1/30 264/120 |
| 6,715,329 | B1 * | 4/2004 | Hametner | B21D 5/02 72/220 |
| 7,037,458 | B2 | 5/2006 | Ford | |
| 9,272,443 | B2 | 3/2016 | Menzel et al. | |
| 2003/0015813 | A1 * | 1/2003 | Rau | B30B 11/02 264/40.1 |
| 2003/0167819 | A1 * | 9/2003 | Olsson | B21J 5/12 72/407 |
| 2004/0137100 | A1 * | 7/2004 | Silbermann | B30B 11/02 425/78 |
| 2005/0087911 | A1 * | 4/2005 | Ford | |
| 2007/0062248 | A1 * | 3/2007 | Solty | F15B 15/1471 72/456 |
| 2007/0266755 | A1 * | 11/2007 | Cook | B21D 51/2615 72/91 |
| 2008/0233779 | A1 * | 9/2008 | Gibellini | B21J 9/022 439/202 |
| 2010/0010238 | A1 * | 1/2010 | Eger | B30B 15/022 549/257 |
| 2012/0027883 | A1 * | 2/2012 | Walker | B22F 3/03 425/287 |
| 2012/0107445 | A1 * | 5/2012 | Murasugi | B22F 3/03 425/551 |
| 2012/0121362 | A1 * | 5/2012 | Taylor | F16B 19/02 411/531 |
| 2012/0216654 | A1 * | 8/2012 | Schmitt | B22F 3/03 75/228 |
| 2013/0252012 | A1 * | 9/2013 | Cooper | B22F 5/007 428/546 |
| 2013/0266681 | A1 * | 10/2013 | Cripps | B22F 3/03 425/234 |
| 2013/0313741 | A1 * | 11/2013 | Menzel et al. | |
| 2018/0015680 | A1 * | 1/2018 | Schmitt | B30B 15/026 |
| 2018/0022050 | A1 * | 1/2018 | Ernst | B22F 3/03 419/66 |
| 2018/0236547 | A1 * | 8/2018 | Schmitt | B30B 11/02 |
| 2018/0257137 | A1 * | 9/2018 | Schmitt | B22F 3/003 |
| 2018/0264768 | A1 * | 9/2018 | Haug | B31B 50/592 |
| 2018/0281063 | A1 * | 10/2018 | Schmitt | B30B 11/005 |
| 2019/0211673 | A1 * | 7/2019 | Gopalan | E21B 34/16 |
| 2019/0358704 | A1 * | 11/2019 | Ernst | B22F 3/03 |
| 2019/0358925 | A1 * | 11/2019 | Schmitt | B30B 15/022 |
| 2020/0122423 | A1 * | 4/2020 | Schmitt | B30B 15/067 |
| 2020/0206813 | A1 * | 7/2020 | Schmitt | B30B 11/027 |
| 2020/0222981 | A1 * | 7/2020 | Schmitt | B30B 11/027 |
| 2021/0154652 | A1 * | 5/2021 | Ken | B01J 35/04 |

FOREIGN PATENT DOCUMENTS

| | | |
|---|---|---|
| DE | 10135523 A1 | 2/2003 |
| JP | H0788699 A | 4/1995 |
| JP | H09164500 A | 6/1997 |
| JP | H10156591 A | 6/1998 |
| JP | H10214742 A | 8/1998 |
| JP | 2000326100 A | 11/2000 |
| JP | 2009166094 A | 7/2009 |

OTHER PUBLICATIONS

PCT International Search Report for corresponding International Application No. PCT/EP2015/055719; dated May 6, 2015.

Brazil Federal Public Service Ministry of Economics National Institute of Industrial Property, Technical Examination Report, Application No. BR112016021381-5, Jan. 29, 2021, 10 pages.

* cited by examiner

PRESS FOR PRODUCING DIMENSIONALLY STABLE PREFORMS AND PRODUCTION PROCESS

This application represents the U.S. national stage entry of PCT International Application No. PCT/EP2015/055719 filed Mar. 18, 2015, which claims priority to German Patent Application No. 10 2014 003 726.6 filed Mar. 18, 2014, the disclosures of which are incorporated herein by reference in their entirety and for all purposes.

The present invention relates to a press for producing dimensionally stable preforms from substantially pulverulent material, and to a method for producing dimensionally stable preforms.

In order for pulverulent material to be compressed it is necessary for a dedicated and independently movable tool plane to be provided for almost every component height. According to the prior art, these tool planes are disposed on top of one another. The tool is constructed and axially moved on these tool planes by means of tool-specific accessories such as die holders, pressure plates, and clamping plates. For example, an adapter construction in which the tool planes are disposed at various height levels is described in each of DE 101 35 523 C2 and U.S. Pat. No. 5,498,147. Due to this construction which is built on, the tool planes, in particular the tool, increase in the axial direction as the complexity increases, since an extension by the length of the subsequent accessory, for example the pressure plate and clamping plate, plus the displacement path in the filling position, pressing position, and exposing position, and of the installation reserve and of the replenishment reserve has to be included for each subsequent tool plane. On account thereof, the tool planes, in particular the tool, rapidly approach the technological boundaries thereof, for example the risk of buckling or bulging according to Euler, of high levels of elasticity, or of high levels of stress in the cross section.

It is an object of the invention to provide a press in a compact form for producing dimensionally stable preforms of high quality and high complexity.

A press for producing dimensionally stable preforms from substantially pulverulent material, having the features of claim 1, and the use of a press, having the features of claim 16, a method for producing dimensionally stable preforms from substantially pulverulent material, having the features of claim 18, a preform having the features of claim 22, and a statistically relevant group of preforms, having the features of claim 23, are proposed. Advantageous features, design embodiments, and refinements are derived from the following description, the figures, as well as from the claims, wherein individual features of one design embodiment are not limited thereto. Rather, one or a plurality of features of one design embodiment is/are capable of being combined with one or a plurality of features of another design embodiment, so as to form further design embodiments. Also, the wordings of the independent claims 1, 16, 18, 22, and 23, in the form as per the application, serve only as a first draft of the wordings of the subject matter to be claimed. One or a plurality of features of the wordings may thus be replaced as well as deleted or likewise may be additionally complemented. Also, the features which are stated by means of a specific exemplary embodiment may also be employed in a general manner or in other exemplary embodiments, in particular in applications.

The invention relates to a press for producing dimensionally stable preforms from substantially pulverulent material, in particular metal powder, preferably iron powder and/or ceramics powder, having a tool having an upper die and a lower die, wherein the upper die and the lower die each comprise at least one die, wherein a first die and a second die are conjointly disposed as the upper die or the lower die so as to slide into one another, each having a first end and a second end lying opposite the first end, wherein at least one of the two dies along a portion conically expands to the extent that the second end thereof has a width which corresponds to an external diameter of a die holder which is associated with the second end.

The term pulverulent material herein describes a sintered material. The material may comprise a predominant metallic proportion. The metallic sintered material herein may in particular have sintered bronze, sintered iron, or any arbitrary sintered steel. Furthermore, the material in the sintered material may at least partially also have further ingredients such as, for example, ceramics.

The term die serves as a generic term, herein describing an upper die and/or a lower die which are required for producing a dimensionally stable preform. The preform may preferably be produced by way of double-sided pressing in a compression space, since this method in terms of the scope of application is far superior to all other methods. The reasons therefor are the good dimensional stability of the preforms and the high productivity at reasonable costs, subject to meaningful and in particular high production volumes. Furthermore, it is possible for both the first die and the second die to be configured as either an upper die or a lower die, and in order for the preform to be pressed, for at least one upper die or lower die is disposed so as to be opposite the first die and the second die, depending on the arrangement of the first die and of the second die.

The term die holder herein refers to a component having a bearing face for the second end of the dies. The die holder may be composed of two rods, for example, the second end of a die bearing thereon. The die holder may assume various shapes; the die holder should preferably correspond to the shape of the second end. For example, the die holder may have a round, oval, square, polygonal shape, a web shape, or any other arbitrary shape. Furthermore, the die holders may be connected to a movable and/or rigid adapter plate, preferably to plane plates, of a press adapter such that a transmission of force may be performed byway of the dies onto the die holders and directly onto the adapter plate, preferably the plane plate, of the press adapter.

The term diameter herein describes that the die and the die holder define a common circle. The diameter is the maximum possible spacing between two points on the circle.

Furthermore, the two dies may be nested such that the at least two dies are mutually telescopic. In this manner, the dies are not sequential in a row. In the case of a sequential arrangement according to the prior art, a plurality of dies are disposed beside one another on one plane and are not disposed so as to be mutually telescopic. As soon as the dies enclose one another or largely enclose one another, a sequential arrangement according to the prior art is no longer possible. Furthermore, it is disadvantageous in the case of a sequential arrangement that a geometrically complex pressure plate is required for disposing the dies on a pressure plate.

More compact presses may be produced on account of the fact that at least one of the two dies along a portion expands to the extent that the second end thereof has a width which corresponds to an external diameter of a die holder which is associated with the second end. The feature along a portion herein describes that the die, post-expansion toward the second end, may still have a portion which is parallel with the longitudinal axis. However, this portion which is parallel with the longitudinal axis is preferably provided with a lesser longitudinal extent which is parallel with the axis than that portion which conically expands. In particular, the conical portion may have an extent which is longer than that portion that is parallel with the longitudinal axis by a factor of at least 2. A bell-shaped or conical widening of the interior is achieved on account thereof. By way of an expansion toward the second end, the dies each can create an installation space in which another die may be accommodated. On account thereof, elongate dies as in the prior art can be dispensed with. Further, the expansion may have a dimension which, for example, is up to ten times, preferably up to five times, in particular up to three times the diameter at the first end of the die. Increased tool rigidity and thus lower elasticity may be achieved on account of the fact that the dies each expand from the first end toward the second end, the diameter being enlarged at the second end, on account of which higher pressing powers may be used. Higher densities in the preforms may be enabled, and apart from the tolerances relating to shape and positioning, the height tolerances of the preforms may be improved. Furthermore, due to the expanded dies the cross section of the dies may be increased, on account of which stresses may be reduced, and on account of which the risk of buckling according to Euler may be minimized or eliminated, respectively. The rigidity of the dies may be high and almost arbitrary, for example be increased up to a factor of two, preferably up to a factor of five, in particular more than a factor of five times higher than the usual rigidity. The term usual rigidity herein refers to the rigidity according to the prior art, which results from the diameter of the dies according to the prior art. Also, more tool planes, for example four or more tool planes, in particular in the case of presses of 1000 kN or less may be implemented byway of an expansion of the dies, under consideration of elasticity. On account thereof, even small components having great complexity may be produced.

On account of the fact that the diameter of the second ends of the dies approximate the diameter of the respective die holders it may be ensured that the dies by way of the second end thereof bear directly on the respective die holder. On account thereof, shorter and/or smaller die holders may be used, on account of which the overall size of the presses may be reduced.

The second end preferably has a width which covers at least an internal diameter of an associated die holder. The second end may thus have substantially the same width as the respective die holder. The second end may have a width which corresponds to the width between the external diameter and the internal diameter of the respective die holder. On account thereof, it is enabled that a plurality of dies and the respective die holders thereof may be disposed so as to be nested in one another in the press.

In one preferred embodiment, the first die at the second end thereof is disposed directly on a first die holder, and the second die at the second end thereof is disposed directly on a second die holder, in each case without the interaction of a pressure plate. On account of the fact that the dies are disposed directly on a die holder, without the use of accessories such as pressure plates and/or clamping plates, the total weight of the total tool construction may be minimized, on account of which a lightweight construction can be enabled so that tooling can be carried out in a short time in the press. By dispensing with pressure plates a force may be transmitted from the first end of the die by way of the expansion directly to the die holders. However, the use of pressure plates in the prior art leads to a solid construction type having a high weight, since the force in the shortest axial installation space by way of the pressure plates has to be transmitted outward onto the die holder. In the case of the present invention, instead of having to replace tools with all the accessories, only the dies may be replaced individually or as a pack. On account thereof, the tooling times and thus the machine down times may be reduced. Furthermore, the installation space in the case of a press having three or more tool planes may be reduced by approximately half. On account thereof, more compact presses having three or more tool planes for producing preforms may be made available. Even in the case of presses below 1000 kN, a number of four or more planes on the product may be implemented, as the otherwise typical long dies may be embodied in a shorter manner. Furthermore, the die holders may be connected to a movable and/or rigid adapter plate, preferably plane plates, of a press adapter such that a transmission of force may be performed by way of the dies onto the die holders directly onto the adapter plate, preferably the plane plate, of the press adapter.

It is preferable for the first die and the second die in a pressing direction along a common longitudinal axis by way of the expanded second ends of the former are disposed so as to slide into one another. The dies here at least in part may enclose one another in a radial manner. The term pressing direction herein describes that direction of the first end of the dies in which the first end of the dies during production of the preform is moved along the longitudinal axis in the press. The dies here in that portion that is in part radially enclosing have a concentric, rotationally symmetrical, U-shaped, square, polygonal, multi-angled geometry or an arbitrary geometry.

Preferably, the first die and the second die are of mutually identical or almost identical elasticity. In particular, all dies on one die side, for example the upper die side or the lower die side, preferably are of identical or almost identical elasticity. The elasticities may be adapted by way of a computation-based optimized design of all dies on the lower die side and/or the upper die side, such that all elasticities are almost identical. For example, a deviation of elasticity between the dies may be preferably <50%, preferably <20%, particularly preferably 10%. The term elastic length modification herein is characterized by the elasticity modulus and the respective stress in the respective die cross section and the associated individual lengths, and may be computed using the following formula:

$$\Delta L_{total} = \sum_{1}^{i} \Delta L_i = \sum_{1}^{i} \frac{L_{0i} * \sigma_i}{E}$$

where $\Delta L_i$=elastic length modification of the respective die portion, $L_{0i}$=length of the respective die portion; $\sigma_i$=stress in the respective die portion, E=elasticity modulus; i=portion number of the respective die portions.

It may be achieved on account of the fact that there is no disparity in elasticity during pressing in all tool planes, on account of which issues during pressing, such as cracks during relaxation, may be avoided. In this manner, preforms which are perfect in terms of quality are made available, even in the case of complicated geometries having many tool planes.

In one preferred embodiment, in an initial position of the press, a first region extends from the first end of the first die, the first end of the second die being disposed in the first region, and/or a second region extends from the second end of the first die, the second end of the second die being disposed in the second region. The first ends of the dies herein in the first region may be disposed either on one plane or so as to be offset. Furthermore, the second ends of the dies in the second region may be disposed either on one plane or so as to be offset. By disposing the first ends of the dies in a first region, and/or by disposing the second ends of the dies in a second region, an identical or almost identical tool length may be enabled, respectively. This may optionally also apply to mandrels, such a center mandrels or mandrels on segments, or to unequivocally disposed mandrels, respectively, which are smooth or stepped, for example. Herein it may be consciously taken into account that the external dies have to be extended in order for the internal dies to be shortened. Otherwise, an arrangement on one plane would not be possible in a meaningful manner. On account thereof, the installation space for the dies in the case of three or more tool planes may be reduced by approximately half. It may also be provided that the dies at the second end thereof, in particular the base piece thereof, are disposed on the respective die holders at various height levels.

It is preferable for the first die and the second die to each conically expand and to each have one base piece, wherein conical expansion is performed by means of a design of the die in the associated region which comprises a rotary body which is at least largely closed, a closed rotary body, a framework construction, a root-based construction, a webbed construction, and/or any other construction design which outwardly expands a die geometry. By using conical expansion, a force may be transmitted from a small cross section, in particular a diameter, at the first end of the die, onto a larger cross section, in particular a diameter, at the second end of the die, onto the die holder. Fastening of the dies to the die holders may be simplified by using a base piece. The base piece herein may have an integral shape or else a multi-part and divided shape.

Preferably, on a base piece at the second end of an expanded die a connection device, preferably a quick-release closure for connecting to a component to be connected, in particular to a die holder, is provided. The quick-release closure herein may have a plurality of fastening elements. For example, the quick-release closure may be configured as a bayonet fastener. The first base piece and the second base piece herein may have a plurality of openings in the form of rotary slots, while the respective die holder has the corresponding buttons which may be introduced into the openings. The tooling time may likewise be reduced by way of a bayonet closure. The dies may be released from the respective die holders by simple rotation. Furthermore, it would be possible for the dies to be fastened to the die holders with the aid of fastening means such as screws, or by clamping means on the respective die holders. The base piece may furthermore have an oval shape, a square shape, or a polygonal shape. Furthermore, with the aid of the quick-release closure, the first die and the second die are capable of being simultaneously fastened to the respective die holders. The tooling time may be shortened by simultaneously releasing and/or assembling all dies from or on the die holders, respectively, and the dies may be assembled as a complete die pack in the press and do not have to be individually assembled in the press.

In one preferred embodiment, the first die and the second die are each produced by an additive manufacturing method, preferably by a laser-sintering method, electrode-beam melting, laser cladding, by a casting method, by an erosive method, or by a chipping method. The term additive manufacturing method is a comprehensive reference to methods for the rapid and cost-effective manufacture of models, samples, prototypes, tools, and final products, which to date have often been referred to as rapid prototyping. This type of manufacturing is performed directly, based on computer-internal data models, from shapeless material, for example fluids, powder, or material of a neutral shape such as a tape or wire shape, for example, by means of chemical and/or physical processes. While these are indeed forming methods, no special tools which have the respective geometry of the workpiece memorized, for example molds in the case of the casting method, are required for any specific product. Laser-sintering is a three-dimensional printing method used for producing spatial structures by sintering from pulverulent prime material. Laser-sintering is a generative layered-construction method in which the workpiece is constructed in a layer-by-layer manner. Arbitrary three-dimensional geometries, also including undercuts, for example workpieces which cannot be manufactured by conventional mechanical or foundry production, may thus be generated byway of the effect of the laser beams. The tools may be manufactured overnight, using a laser-sintering method. On account thereof, the time for manufacturing tools may be shortened by factors, as compared with other production methods. Electrode-beam melting is a method for producing metallic components from a powder bed. Using an electron beam as a source of energy, a metal powder is melted in a targeted manner, on account of which components of almost arbitrary geometry may be produced directly based on the construction data. To this end, a powder layer is alternatingly applied by a doctor blade onto the previous powder layer and radiated by an electron beam. In this manner, the desired component is generated in a layered manner. Laser cladding is a method in which a surface application by means of fusing and simultaneous application of an almost arbitrary material onto a workpiece is performed. The latter may be effected in the form of a powder, for example a metal powder, or else using a welding wire or a welding rod. A high-output laser, mainly a diode laser or a fiber laser, previously known as a $CO_2$ laser and a Nd:YAG laser, serves as a heat source in the case of laser cladding. In a casting method, the dies may have both a simple as well as a complicated design. A die can be rapidly produced by the casting method in particular in the case of very simple geometries, for example in the case of a circular die. In the case of an erosive method the dies may be produced by a subtractive method, for example by spark erosion, wire erosion, or die sinking. In the case of chipping method, the dies may be produced inter alia by turning, milling, sawing, boring, grinding, hard-milling, or by other subtractive methods.

It is preferable for the first die and the second die, in each case expanded, to each have a numerically conceived and load-optimized geometry of mutually matched elasticity. For example, a bionic conceptual method or a design-optimizing software may be applied in order for the equalization of elasticity to be achieved. It may be achieved with the aid of a numerically conceived and load-optimized geometry that no disparity in elasticity arises during pressing of all tool planes, on account of which issues during pressing, such as cracks during relaxation and/or demolding, may be avoided. In this manner, preforms of perfect quality may be made available even in the case of complicated geometries having many tool planes.

Preferably, at least three or more dies are each expanded to the extent that the respective second end thereof has a width which at least approximates an external diameter of a die holder which is associated with the respective second end. In this way, the dies may be disposed so as to be mutually nested in the press, wherein the second ones of the dies may each be disposed on one plane or on an almost identical plane.

In one preferred embodiment, at least one upper die and one lower die each are expanded to the extent that the respective second end thereof has a width which at least approximates an external diameter of a die holder which is associated with the respective second end.

The invention furthermore relates to a die for a press as has been illustrated above, wherein the die at the second end thereof has a disposed fastening device and is expanded to the extent that the expanded width thereof at least approximates at least one die holder to be disposed. This fanning can ensure that during production of the preform the force may be transmitted from the first end to the second end, and from the second end to the die holder, without the flow of force being diverted by a pressure plate.

Preferably, a die holder is releasably disposed on the fastening device at the second end of the die. In this manner, the die may be rapidly fastened to or released from the die holder. Furthermore, the die may be fastened to the die holder without the aid of a pressure plate. The second end may bear directly on the die holder and be fastened with the aid of a fastening device, preferably a quick-release closure, in particular a bayonet fastener, to the die holder. On account thereof, rapid replacing of the die may be enabled, on account of which tooling times may be shortened and unnecessary machine down times may be avoided.

In one preferred embodiment, the die at the first end thereof terminates in at least two part-dies. On account thereof, more complicated preforms may be produced using more compact tool constructions, since a plurality of part-dies may be used with the same number of dies. Furthermore, the press may be reduced in size on account thereof, since a die having part-dies requires less space than if a dedicated die is used for each part-die.

Furthermore, the invention relates to the use of a press and/or of a die as has been described above, for producing a preform, preferably a preform which is stable in terms of the final dimensions, from pulverulent material.

The preform is preferably used for producing a component part. In particular, the component elements may be a safety-relevant component. Preforms for producing component parts may be produced using a press as has been described above, wherein the preforms have no cracks which may be created during relaxation and/or demolding of the preform.

According to the invention, a method for producing a dimensionally stable preform from substantially pulverulent material, in particular metallic powder, iron powder, and/or ceramics powder, is proposed, the method comprising the following steps:

filling a pulverulent material into an opening of a template, pressing the pulverulent material in the template, wherein the pulverulent material on a first template side is compressed by at least one upper die and from a second template side, which is opposite the first template side, by at least two lower dies wherein the two lower dies slide into one another and are each connected to one die holder, wherein a pressing power from a first end of a lower die is directed along the lower die by way of an expanded second end of the lower die so far outward that on a die holder which is associated with the lower die a force vector which acts in the movement direction of the lower die acts without modification from the lower die on the die holder, and demolding the preform from the template.

In particular, the force vector, in a non-modified manner from the lower die to the die holder, during compressing may act as a compression force, and during demolding may act as a friction force. By way of an equalization of elasticity between the upper die and/or the lower die, the formation of cracks in the preform during relaxation and demolding may be avoided.

This method may furthermore be applied in the case of a press which on a first template side has at least one lower die, and on a second template side which is opposite the first template side has at least two upper dies.

Preferably, uniform relaxation of the preform for avoiding stress cracks in the preform is performed by the at least two lower dies and/or upper dies.

The at least two lower dies preferably cause uniform relaxation and demolding of the pulverulent material.

In one preferred embodiment, the first lower die and the second lower die act by way of approximately identical elasticity on the preform. In this manner, the preform cannot be torn apart by dissimilar elasticities of the dies when the compression stress is removed from the preform during relaxation of the preform. Relaxation cracks and shear cracks may be counteracted and even largely compensated for by approximately identical elasticity of the dies.

The invention furthermore relates to a preform from a substantially pulverulent material, wherein the preform is produced by means of a plurality of expanded dies as have been described above, in a press as has been described above, by means of a method as has been described above.

According to the invention, a statistically relevant group of preforms from one manufacturing batch on one press, preferably as has been described above or hereunder, respectively, and/or a production method as has been described above or hereunder, respectively, is claimed, wherein all preforms of this group are relaxed in each case without one or a plurality of de-stressing cracks. In this manner, it may be ensured that preforms of impeccable quality, in particular in the case of safety-relevant components, are produced. Herein, a concept is utilized in particular in which the dies are conceived such that complete physical equalization of the elasticity of the tool elements, in particular of the dies, is provided. This enables, for example, that equalization of the dissimilar de-stressing of individual dies by means of press controls or press regulators, respectively, may at least largely be dispensed with, or that the latter are preferably not required.

Further advantageous design embodiments as well as features are derived from the figures and the associated description hereunder. The individual features which are derived from the figures and from the description are merely exemplary and not limited to the respective design embodiment. Rather, one or a plurality of features of one or a plurality of figures may be combined with other features of the description above, so as to form further design embodiments. Therefore, the features are stated in an exemplary and non-limiting manner. In the figures.

Figure 1:
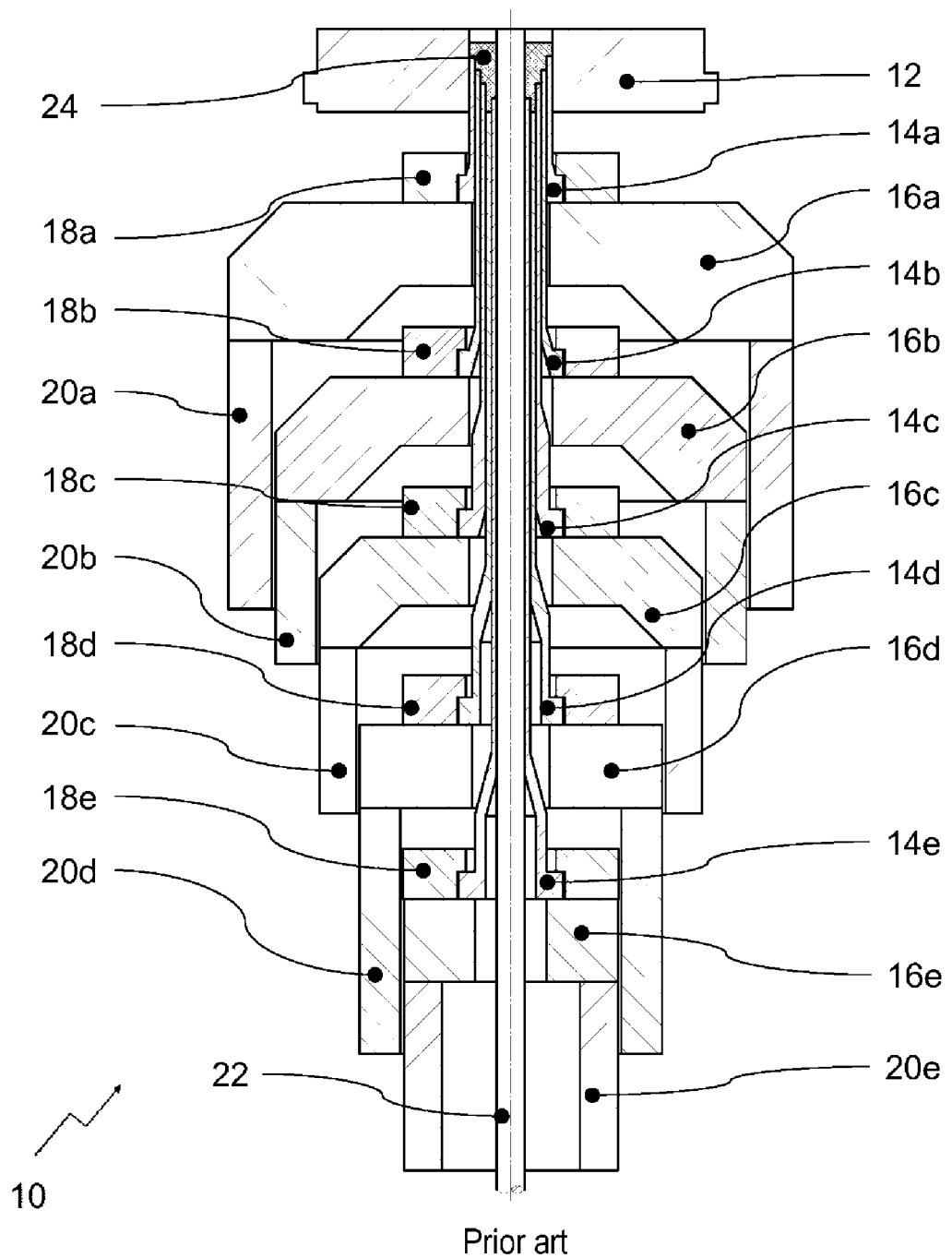
FIG. 1 shows a half-section of a tool construction for a press, according to the prior art, comprising a lower die side, a mandrel, and a template.

FIG. 1 shows a half-section of a tool construction 10 of a lower die side of a press which is used for producing a preform according to the prior art, such as is known from U.S. Pat. No. 5,498,147, for example. The press has a rotationally symmetrical construction byway of five tool planes. Each tool plane comprises one each of the five dies 14a, 14b, 14c, 14d, 14e, one each of the five pressure plates 16a, 16b, 16c, 16d, 16e, one each of the five clamping plates 18a, 18b, 18c, 18d, 18e, and one each of the five die holders 20a, 20b, 20c, 20d, 20e. Furthermore, the press has a template 12 and a mandrel 22. The five dies 14a, 14b, 14c, 14d, 14e in this exemplary embodiment are illustrated as lower dies, and by way of the first end thereof protrude predominantly into an opening of the template 12, so as to form a compression space for the preform. By way of the second end thereof, the five dies 14a, 14b, 14c, 14d, 14e are disposed on the pressure plates 16a, 16b, 16c, 16d, 16e. Furthermore, the five dies 14a, 14b, 14c, 14d, 14e byway of the respective clamping plates 18a, 18b, 18c, 18d, 18e are fixed to the respective pressure plates 16a, 16b, 16c, 16d, 16e. During production of the preform, the pressure plates 16a, 16b, 16c, 16d, 16e serve for absorbing the force acting on the respective die 14a, 14b, 14c, 14d, 14e, transmitting this absorbed force to the respective die holders 20a, 20b, 20c, 20d, 20e. The die holders 20a, 20b, 20c, 20d, 20e serve for bridging the spacing between the respective pressure plate 16a, 16b, 16c, 16d, 16e and a tool-independent adapter plate. FIG. 1 elucidates that due to the increasing tool lengths, in particular of the dies 14a, 14b, 14c, 14d, 14e, the critical buckling length according to Euler is rapidly reached such that there are physical limits to this tool construction 10.

Figure 1A:
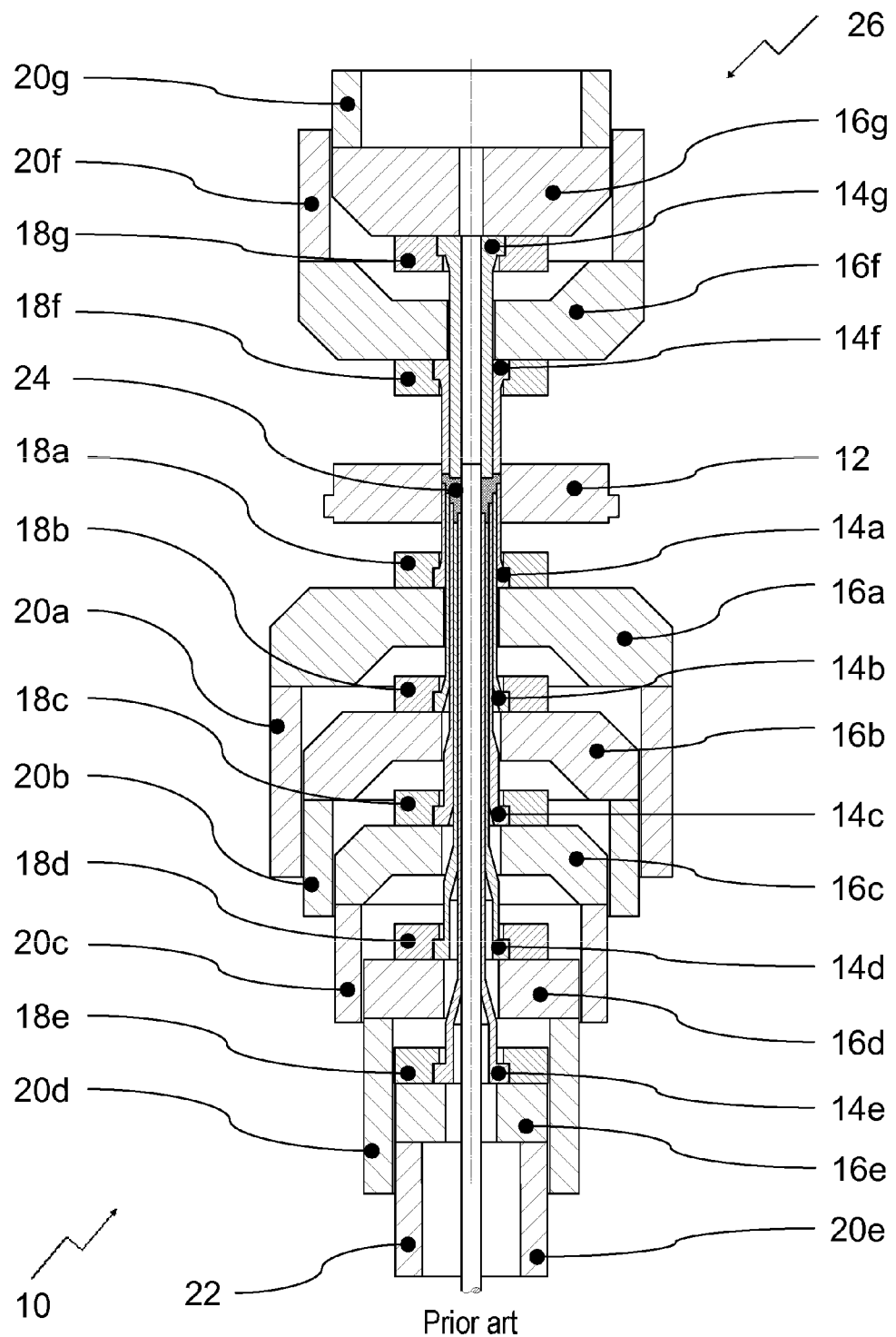
FIG. 1a shows a tool construction according to FIG. 1, having an upper-die tool construction, for producing pulverulent preforms.

FIG. 1a shows the tool construction 10 of FIG. 1. A tool construction 26 across two upper-die tool planes is additionally indicated. Each tool plane comprises one each of the two dies 14f, 14g, two pressure plates 16f, 16g, two clamping plates 18f, 18g, and two die holders 20f, 20g. As can be seen, the dies 14f, 14g are configured as upper dies and during the compression procedure protrude predominantly through an opening into the template 12. The opening into which the dies 14f, 14g protrude into the template 12 is opposite that opening of the template 12 into which the dies 14a, 14b, 14c, 14d, 14e protrude. The first ends of the dies 14a, 14b, 14c, 14d, 14e and of the dies 14f, 14g, together with the template 32 configure a compression space in which a preform 24 from a metal power is formed by pressing. Furthermore, it can be seen that the dies 14f, 14g at the second end thereof which is opposite the first end are disposed on the pressure plates 16f, 16g. Furthermore, the dies 14f, 14g byway of the respective clamping plates 18f, 18g are fixed to the respective pressure plates 16f, 16g. During production of the preform 46, the pressure plates 16f, 16g serve for absorbing the force acting on the respective die 14f, 14g, transmitting this absorbed force to the respective die holders 20f, 20g. The die holders 20g, 20f serve for bridging the spacing between the respective pressure plate 16f, 16g and a tool-independent adapter plate.

Figure 2:
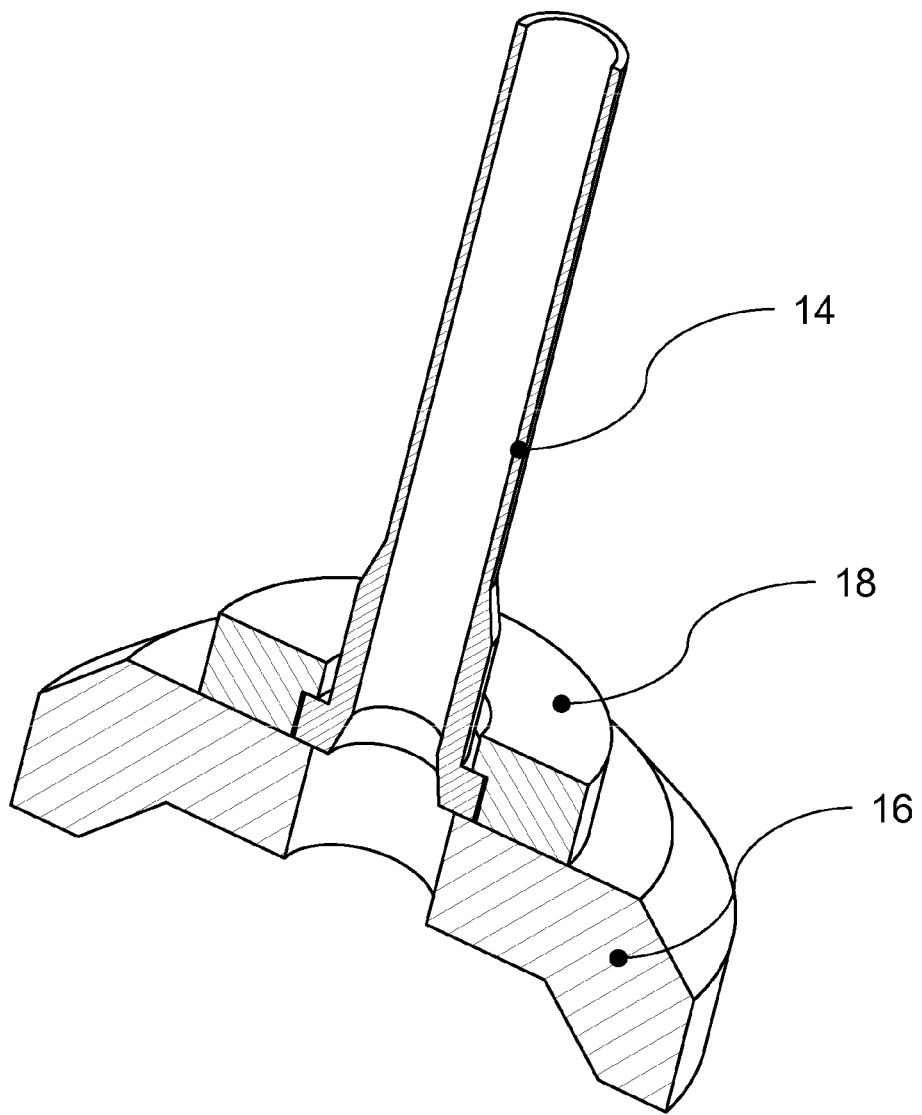
FIG. 2 shows a sectional view of a tool plane according to FIG. 1, composed of a die, a clamping plate, and a pressure plate, according to the prior art.

FIG. 2 shows a half-section of a tool plane according to FIG. 1 and FIG. 1a. The tool plane comprises a rotationally symmetrical die 14, wherein the die 14 may be an upper die or a lower die, a clamping plate 18, and a pressure plate 16. The die 14 is reinforced in part-regions. The pressure stresses in the die 14 are reduced on account thereof. This leads to a reduction in elasticity under load and in the risk of buckling. The clamping plate 18 serves for axially securing the die 14 on the pressure plate 16. The pressure plate 16 serves for absorbing and transmitting force.

Figure 3:
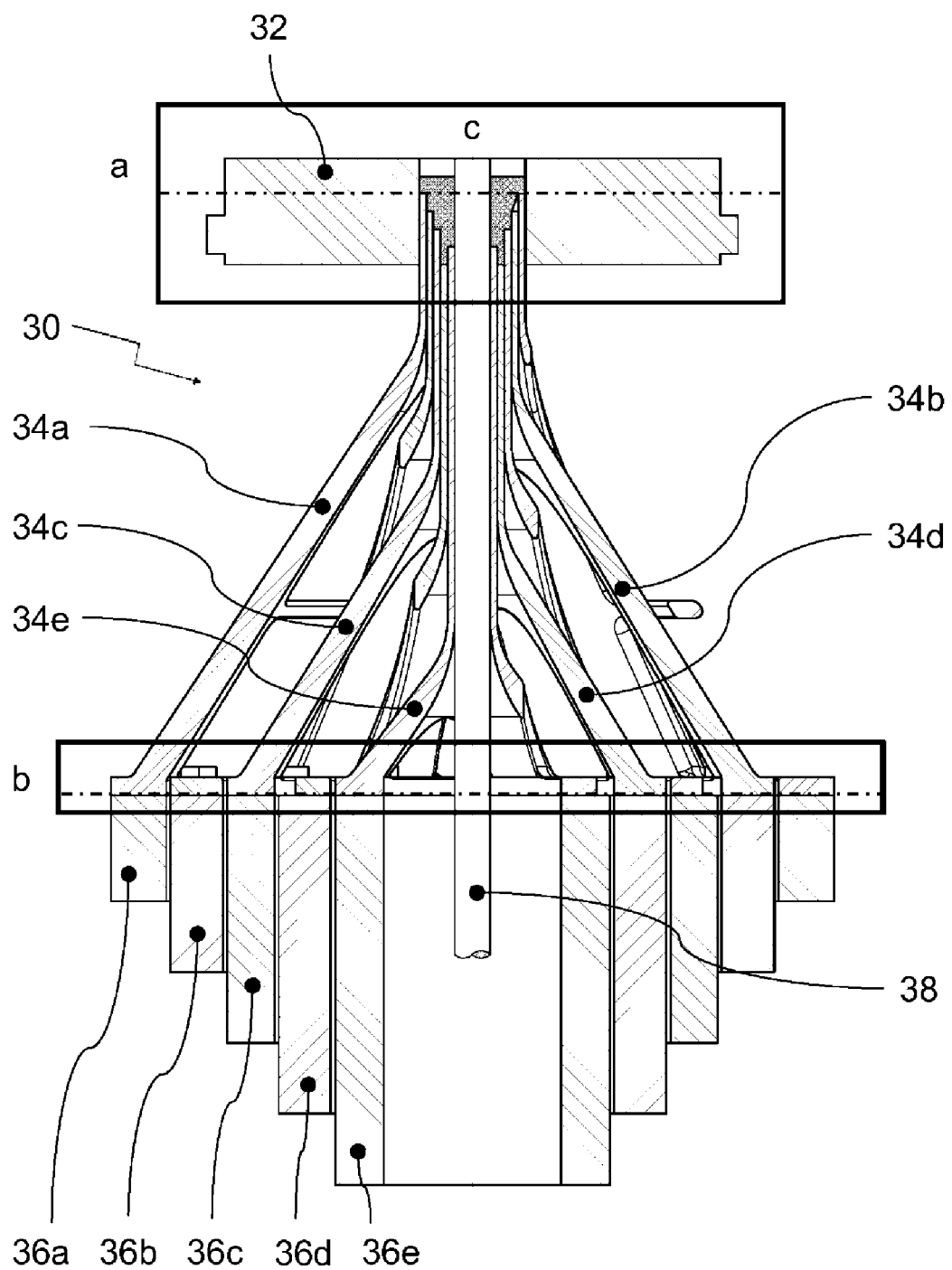
FIG. 3 shows a half-section of a tool construction for a press, according to the invention, comprising a lower die side, a mandrel, and a template.

FIG. 3 shows a tool construction 30 of a lower die side for a press which is used for producing dimensionally stable preforms from substantially pulverulent material, in particular iron powder and/or ceramics powder, having a template 32, a mandrel 38, and five tool planes. The tool planes are composed of five dies 34a, 34b, 34c, 34d, 34e and of five die holders 36a, 36b, 36c, 36d, 36e. The dies 34a, 34b, 34c, 34d, 34e in this exemplary embodiment are illustrated as lower dies, and on the longitudinal axis thereof each have a first end which protrudes predominantly into an opening of the template 32, and a second end which in each case is disposed so as to be opposite the first end is in each case disposed directly, without the aid of pressure plates and/or clamping plates, on a die holder 36a, 36b, 36c, 36d, 36e. The die holders 36a, 36b, 36c, 36d, 36e move in a mutually independent manner, and are connected to movable and/or rigid adapter plates of the press. It can be seen in FIG. 3 that the dies 34a, 34b, 34c, 34d, 34e are disposed so as to slide into one another, wherein the dies 34a, 34b, 34c, 34d, 34e along a portion expand to such an extent that the second end thereof has a width which at least approximates an external diameter of a die holder 36a, 36b, 36c, 36d, 36e which is associated with the second end. Furthermore, the second end has a width which covers at least an internal diameter of an associated die holder 36a, 36b, 36c, 36d, 36e. In this manner, the flow of force is performed directly in the dies 34a, 34b, 34c, 34d, 34e, from the shape-imparting region at the first end in the template 32 outwardly by way of the die holders 36a, 36b, 36c, 36d, 36e to the movable and/or rigid adapter plates or press plates. It is consciously taken into account herein that the external dies have to be extended in order for the internal dies to be shortened. The expansion of the dies 34a, 34b, 34c, 34d, 34e allows the buckling risk according to Euler to be neglected. The dies 34a, 34b, 34c, 34d, 34e are each of identical or almost identical elasticity. Adapting the elasticity is performed by way of optimizing the design of all tool elements on the lower die side and/or the upper die side. It can be furthermore seen in FIG. 3 that, in the illustrated initial position of the press, a first region a, the height of which depends on the geometry of the component, extends from the first end of the first die 34a, and that a second region b extends from the second end of the first die 34a. The second end of each of the dies 34a, 34b, 34c, 34e is disposed on one plane in the second region b.

It can be furthermore seen in FIG. 3 that the dies 34a, 34b, 34c, 34d, 34e in a pressing direction along the longitudinal axis c are disposed so as to slide into one another, wherein the external dies radially enclose the internal dies. The total lengths of the dies 34a, 34b, 34c, 34d, 34e mutually differ by ≤50%, preferably ≤25%, in particular ≤10%, so as to enable preforms which have different complicated shapes. This also implies an elongation of the height of the second region b.

Figure 3A:
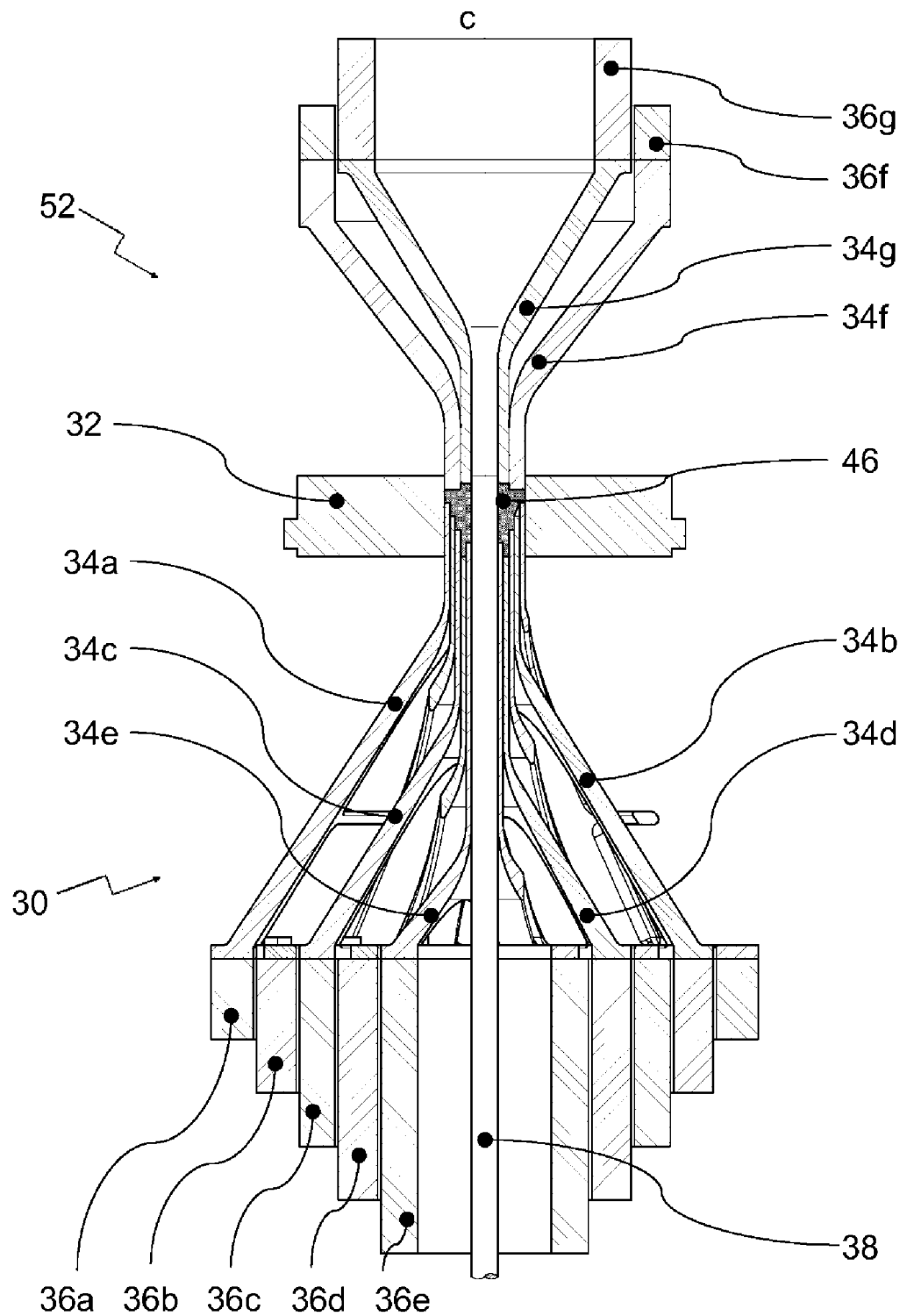
FIG. 3a shows a tool construction according to FIG. 3, having an upper-die tool construction, for producing pulverulent preforms.

FIG. 3a shows the tool construction 30 of FIG. 3. A tool construction 52 across two upper-die tool planes is additionally indicated. Each tool plane comprises one each of the two dies 34f, 34g and two die holders 36f, 36g. As can be seen, the dies 34f, 34g are configured as upper dies and protrude predominantly through an opening into the template 32. The opening into which the dies 34f, 34g protrude into the template 32 is opposite that opening of the template 32 into which the dies 34a, 34b, 34c, 34d, 34e protrude. The first ends of the dies 34a, 34b, 34c, 34d, 34e and of the dies 34f, 34g together with the template 32 configure a compression space by way of which a preform 46 is shaped from a metal powder by pressing. It can furthermore be seen that the dies 34f, 34g at the second end which is opposite the first end are also disposed on the die holders 36f, 36g. During production of the preform 46, the die holders 36f, 36g serve for absorbing the force acting on the respective die 34f, 34g, transmitting this absorbed force to a tool-independent adapter plate.

The method for producing dimensionally stable preforms 46 from substantially pulverulent material, in particular iron powder and/or ceramics powder, using a press having the tool construction 30 and 52 shown in FIG. 3a is carried out as follows. First, a pulverulent material is filled into an opening of the template 32. Thereafter, the pulverulent material in the template 32 is compressed on a first template side by the two dies 34f, 34g which are configured as upper dies, and from a second template side which is opposite the first template side by the five dies 34a, 34b, 34c, 34d, 34e which are configured as lower dies. The dies 34a, 34b, 34c, 34d, 34e are each connected to one die holder 36a, 36b, 36c, 36d, 36e and slide into one another, wherein a compressive force is directed from a first end of a die 34a, 34b, 34c, 34d, 34e along the die 34a, 34b, 34c, 34d, 34e by way of an expanded second end of the die 34a, 34b, 34c, 34d, 34e outwardly to such an extent that a force vector which in the movement direction of the die 34a, 34b, 34c, 34d, 34e acts on a die holder 36a, 36b, 36c, 36d, 36e which is assigned to the die 34a, 34b, 34c, 34d, 34e, acts in a non-modified manner from the die 34a, 34b, 34c, 34d, 34e on the die holder 36a, 36b, 36c, 36d, 36e. The same occurs simultaneously on the dies 34f, 34g. The dies 34f, 34g slide into one another, wherein a compressive force is directed from a first end of a die 34f, 34g along the die 34f, 34g by way of an expanded second end of the die 34f, 34g outwardly to such an extent that a force vector which in the movement direction of the die 34f, 34g acts on a die holder 36f, 36g which is assigned to the die 34f, 34g, acts in a non-modified manner from the die 34f, 34g on the die holder 36f, 36g. The preform 46 is demolded from the template 32 after the pressing procedure. In the method, there is a flow of force directly from the shape-imparting region of the dies in the region a along the dies 34a, 34b, 34c, 34d, 34e, 34f, 34g to the respective die holders 36a, 36b, 36c, 36d, 36e, 36f, 36g. The force which during compressing acts on the dies 34a, 34b, 34c, 34d, 34e, 34f, 34g and on the die holders 36a, 36b, 36c, 36d, 36e, 36f, 36g is the compression force, and the force which acts during demolding is the friction force. No cracks are created in the preforms 46 during relaxation and demolding due to the use of this method and of the press as has been described above. Furthermore, uniform de-stressing of the preform 46 is performed by the dies 34a, 34b, 34c, 34d, 34e, 34f, 34g in the method, so as to avoid stress cracks in the preform 46. In the method, the dies 34a, 34b, 34c, 34d, 34e, 34f, 34g cause uniform compressing of the pulverulent material, and dies 34a, 34b, 34c, 34d, 34e, 34f, 34g, by virtue of the numerical concept thereof, act on the preform 46 with almost identical elasticity.

Figure 4:
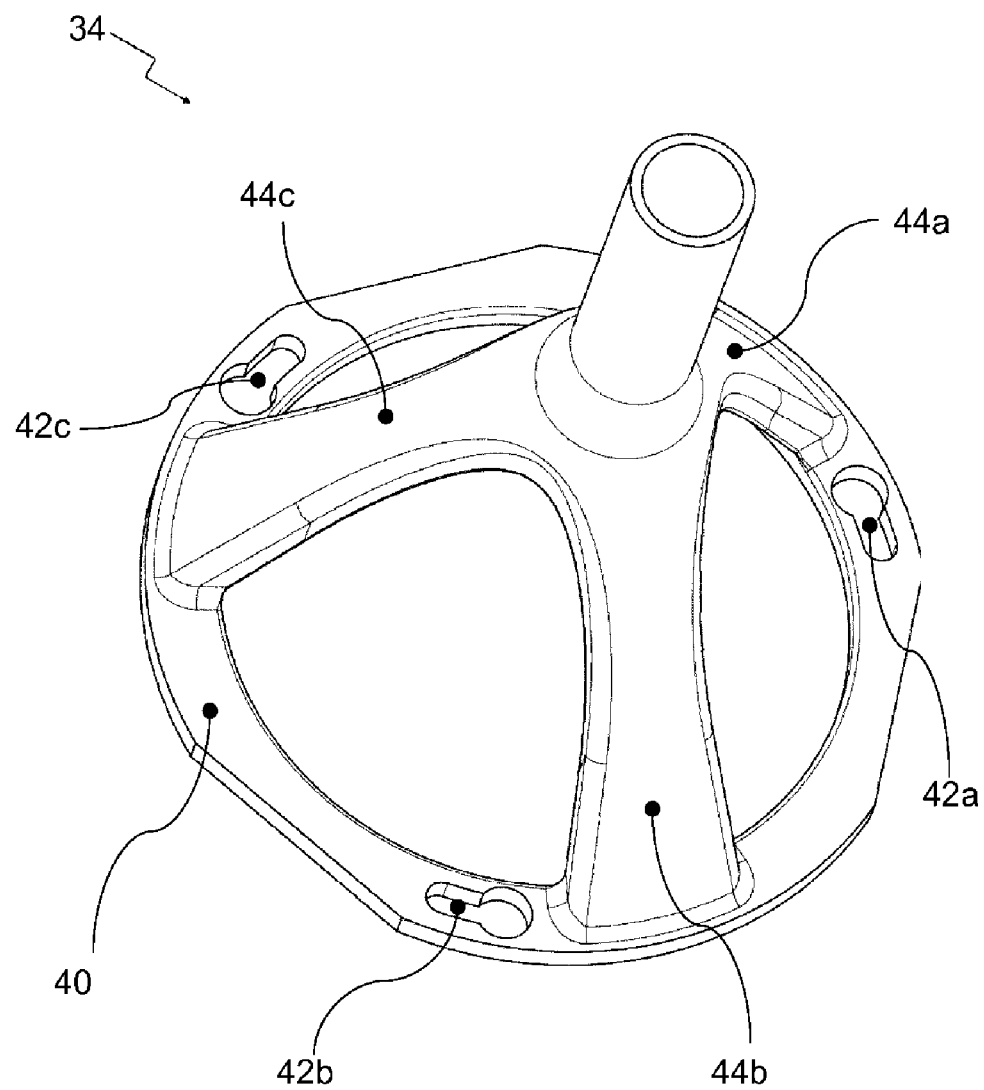
FIG. 4 shows an isometric view of a die according to the present invention.

FIG. 4 shows a die 34. The die 34 may be an upper die or a lower die. The die 34 is employed in the tool construction 30 or 52 according to FIG. 3 and FIG. 3a, respectively. The die 34 is configured to be rotationally symmetrical. The die 34 conically expands, and at the second end thereof has a base piece 40. The conical expansion is performed by means of a web construction having three webs 44a, 44b, 44c. The expansion at the second end may be five times the diameter of the first end, for example. The base piece 40 is of annular shape. A fastening device comprising three quick-release closures 42a, 42b, 42c in the form of a bayonet fastener is illustrated in the base piece 40. The die 34 with the aid of the quick-release closures 42a, 42b, 42c is connected to a die holder. On account thereof, the tooling time can be shortened since no tool is required any longer for releasing and fastening the die 34 from/to the die holder. Furthermore, it is possible for the dies 34a, 34b, 34c, 34d, 34e, which are illustrated in FIG. 3, to be simultaneously fastened together as one die pack to the respective die holders 36a, 36b, 36c, 36d, 36e, or to simultaneously release said dies from the respective die holders 36a, 36b, 36c, 36d, 36e. The transmission of force from the first end of the die 34 in an exemplary manner is performed by way of the webs 44a, 44b, 44c to the ring 40 and from there to the die holder. The type of flow of force is numerically conceived, according to the required strength. Bionic designs may also be used herein. In this manner, it may be ensured that all dies of one tool construction 30 have matching elasticity. The die 34 may be produced by an additive method, for example by laser-sintering methods, casting methods, by an erosive method, or by a chipping method.

Figure 5:
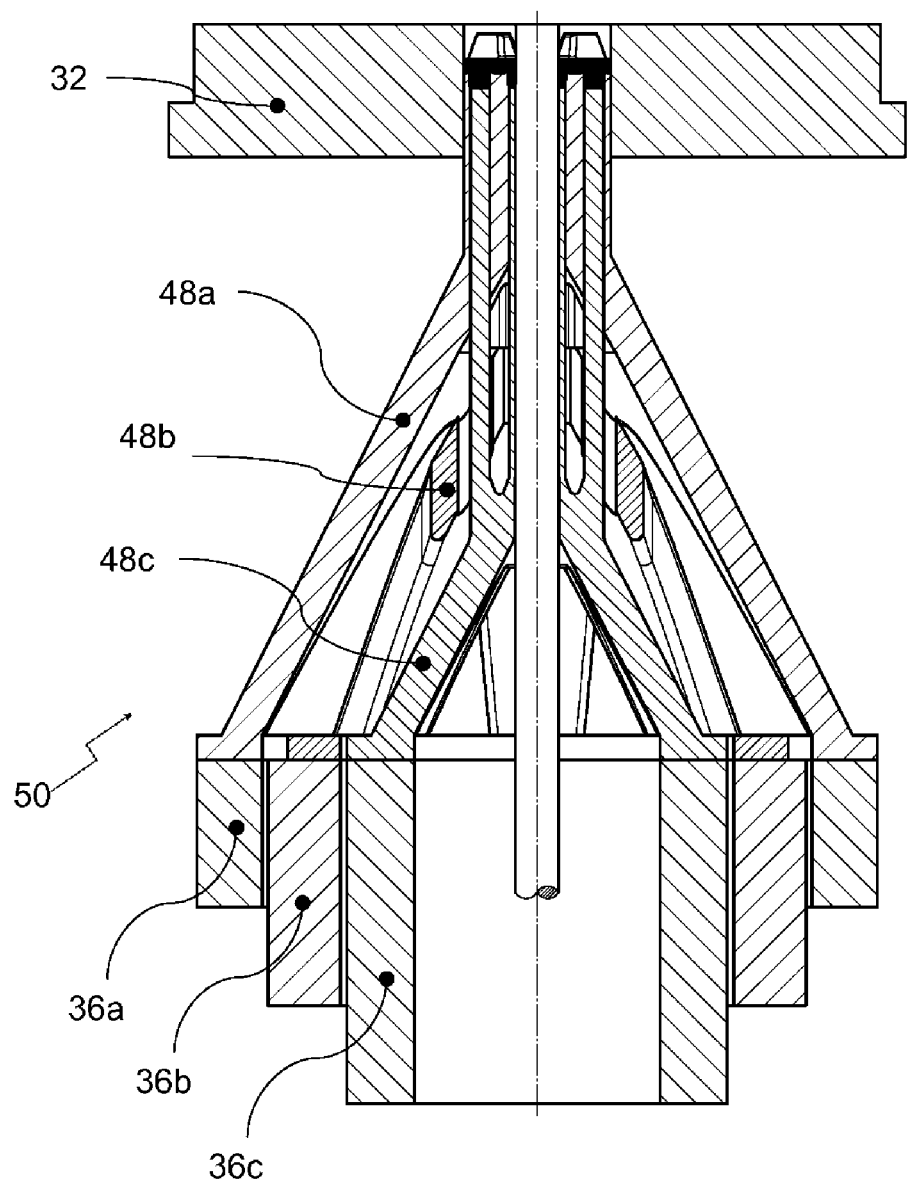
FIG. 5 shows a half-section of a tool construction for a press, according to a further embodiment of the invention, comprising a lower die side, a mandrel, and a template.

FIG. 5 shows a further embodiment of a tool construction 50 of a lower die side for a press which is used for producing dimensionally stable preforms from substantially pulverulent material, in particular iron powder and/or ceramics powder, having a template 32 and three tool planes. The tool planes are composed of three dies 48a, 48b, 48c, and of three die holders 36a, 36b, 36c. The dies 48a, 48b, 48c in this exemplary embodiment are illustrated as lower dies, each on the longitudinal axis thereof having a first end which protrudes into an opening of the template 32, and each having a second end which is opposite the first end and which is directly disposed on a die holder 36a, 36b, 36c, without the aid of pressure plates and/or clamping plates. The die holders 36*a*, 36*b*, 36*c* move in a mutually independent manner and are connected to movable and/or rigid adapter plates or press plates of the press. It can be seen in FIG. 5 that the dies 48*a*, 48*b*, 48*c* are disposed so as to slide into one another, wherein the dies 48*a*, 48*b*, 48*c* each expand from the first end to the second end, being nested in one another. In this manner, the flow of force is performed directly in the dies 48*a*, 48*b*, 48*c*, from the shape-imparting region at the first end in the template 32 outwardly by way of the die holders 36*a*, 36*b*, 36*c* to the movable and/or rigid adapter plates or press plates. Herein it is consciously taken into account that the external dies have to be extended in order for the internal dies to be shortened. The dies 48*a*, 48*b*, 48*c* are each of identical or almost identical elasticity. As opposed to the exemplary embodiment in FIG. 3, the dies 48*a*, 48*b*, 48*c* in the exemplary embodiment in FIG. 5 are only in part radially enclosed by one another. As a peculiarity, the die 48*c* shows that three part-dies may be collectively disposed on one die 48*c*.

Figure 5A:
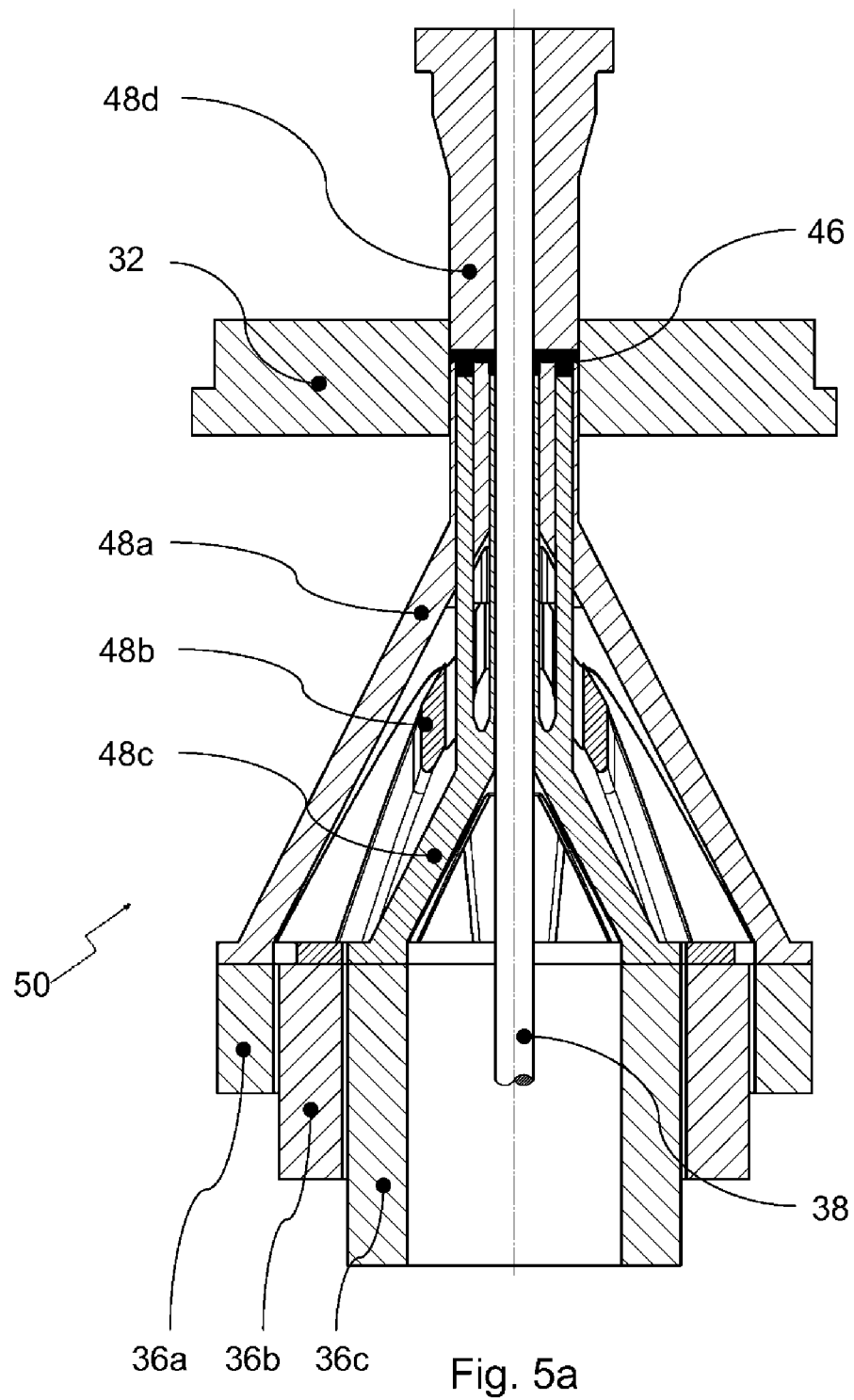
FIG. 5a shows a tool construction according to FIG. 5, having an upper die, for producing pulverulent preforms.

FIG. 5*a* shows the tool construction 50 of FIG. 5. A die 48*d* is additionally indicated. As can be seen, the die 48*d* is configured as an upper die and protrudes through an opening into the template 32. The opening into which the die 48*d* protrudes into the template 32 is opposite to that opening in the template 32 into which the dies 48*a*, 48*b*, 48*c* protrude. The first ends of the dies 48*a*, 48*b*, 48*c* and of the die 48*d* together with the template 32 configure a compression space by way of which a preform 46 of a metal powder is shaped by pressing. It can furthermore be seen that the die 48*d* at the second end thereof which is opposite the first end is not disposed on a die holder. Instead, the force which during production of the preform acts on the die 48*d* may be transmitted directly to a tool-independent adapter plate, or the die 48*d* may be connected to accessories according to the prior art, such as a pressure plate and a clamping plate.

Figure 6:
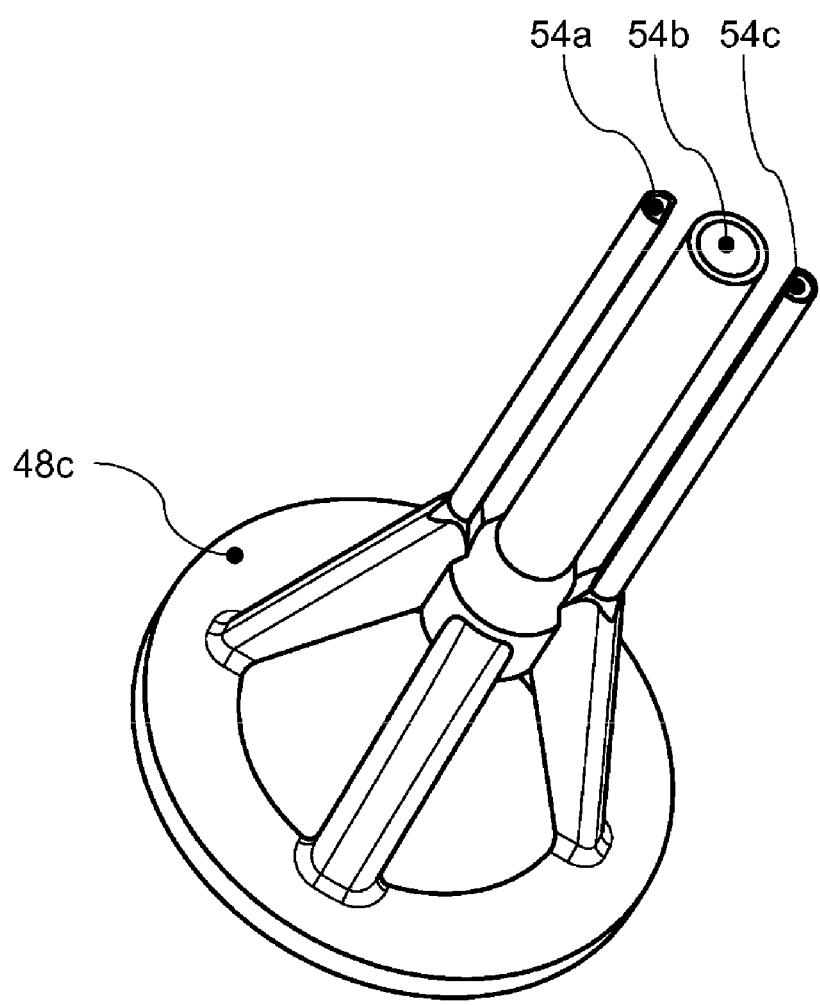
FIG. 6 shows an isometric view of a further embodiment of a die according to the invention, in which a plurality of part-dies emanate from a base piece.

FIG. 6 shows the die 48*c* of FIG. 5 and FIG. 5*a*. The die 48*c* at the first end thereof has three different part-dies 54*a*, 54*b*, 54*c*. By way of the construction of a die according to the invention, it is thus possible for a plurality of individual dies as part-dies 54*a*, 54*b*, 54*c* to be collectively disposed on one common die 48*c*.

Figure 7:
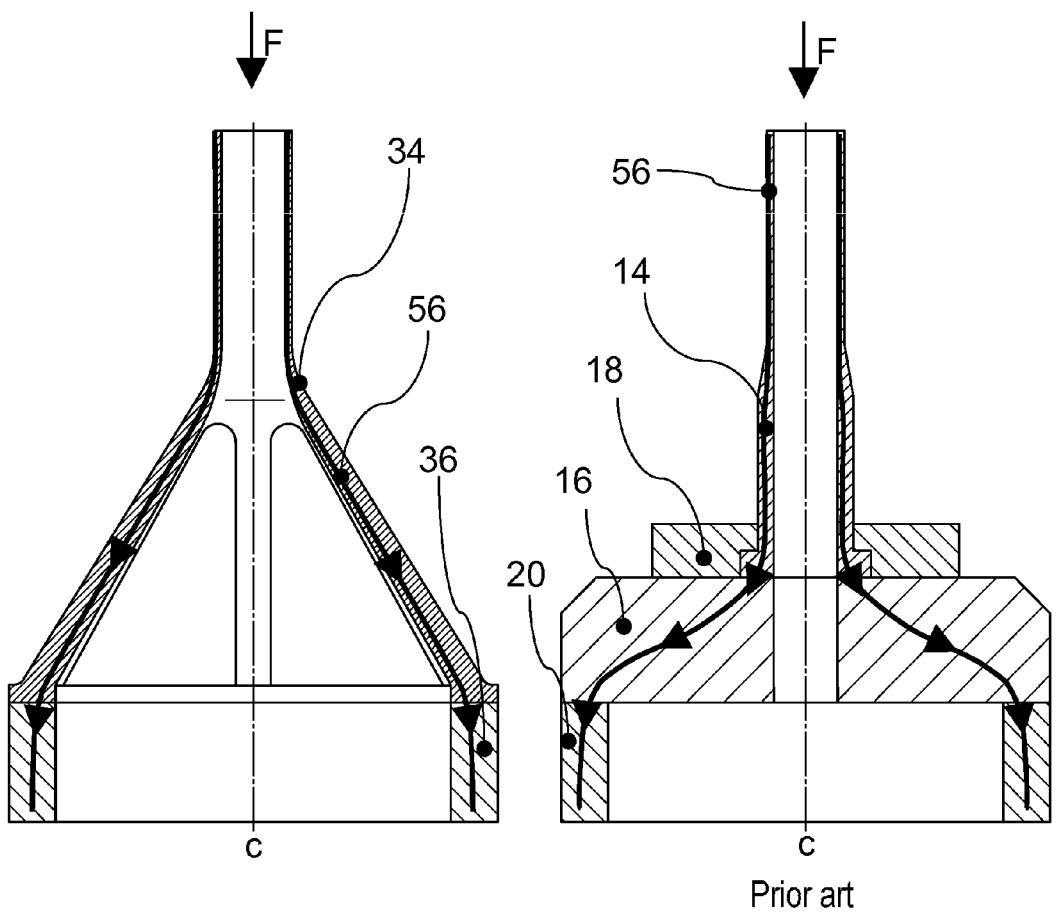
FIG. 7 shows a comparison between the flow of force in a die according to the prior art and a die according to the present invention.

FIG. 7 shows the profile of the force 56 during the pressing procedure in a tool plane according to the invention, as compared to a tool plane of the prior art. In FIG. 7, the tool plane according to the invention is illustrated on the left side, and the tool plane according to the prior art is illustrated on the right side. The force 56 running through the tool plane is illustrated as a solid line, in each case running from the first end of the die to the die holder. Furthermore, the movement direction of the dies is illustrated as an arrow F along the longitudinal axis c. In the case of a tool plane according to the invention, the force 56 runs from the first end of the die 34 along the expansion of the die 34 and byway of the second end of the die 34 is transferred directly to the die holder 36. Due to the expansion in the die 34, the force 56 runs in a harmonic and favorable manner from the first end of the die 34 to the die holder 36, without the flow of force being massively diverted in terms of the flow direction thereof. This is elucidated in particular by the force vectors which are indicated as arrows at the transition between the die 34 and the die holder 36. It can be seen in FIG. 7 that the force is transferred directly from the die 34 to the die holder 36. By contrast, the force 56 in the case of the prior art runs from the first end of the die 14 by way of the second end of the die 14 into a pressure plate 18. It is only then that the force may be transmitted from the pressure plate 18 into the die holder 20. Furthermore, the die 14 is connected to the pressure plate 18 byway of a clamping plate 16. Also in this embodiment, the force vectors at the transition between the die 14 and the pressure plate 18, and between the pressure plate 18 and the die holder 20, are illustrated as arrows. It can be seen that the force by way of the die 14 is transmitted in a linear manner into the pressure plate 18. By virtue of the alignment of the pressure plate 18, the force is diverted at the pressure plate 18 in order to be able to transmit the force 56 to the die holder 20. Furthermore, the pressure plate 18 has the disadvantage that the force 56 has to be discharged outwardly to the die holder 20 in the shortest axial installation space, leading to a solid construction type having a high weight.

Figure 8:
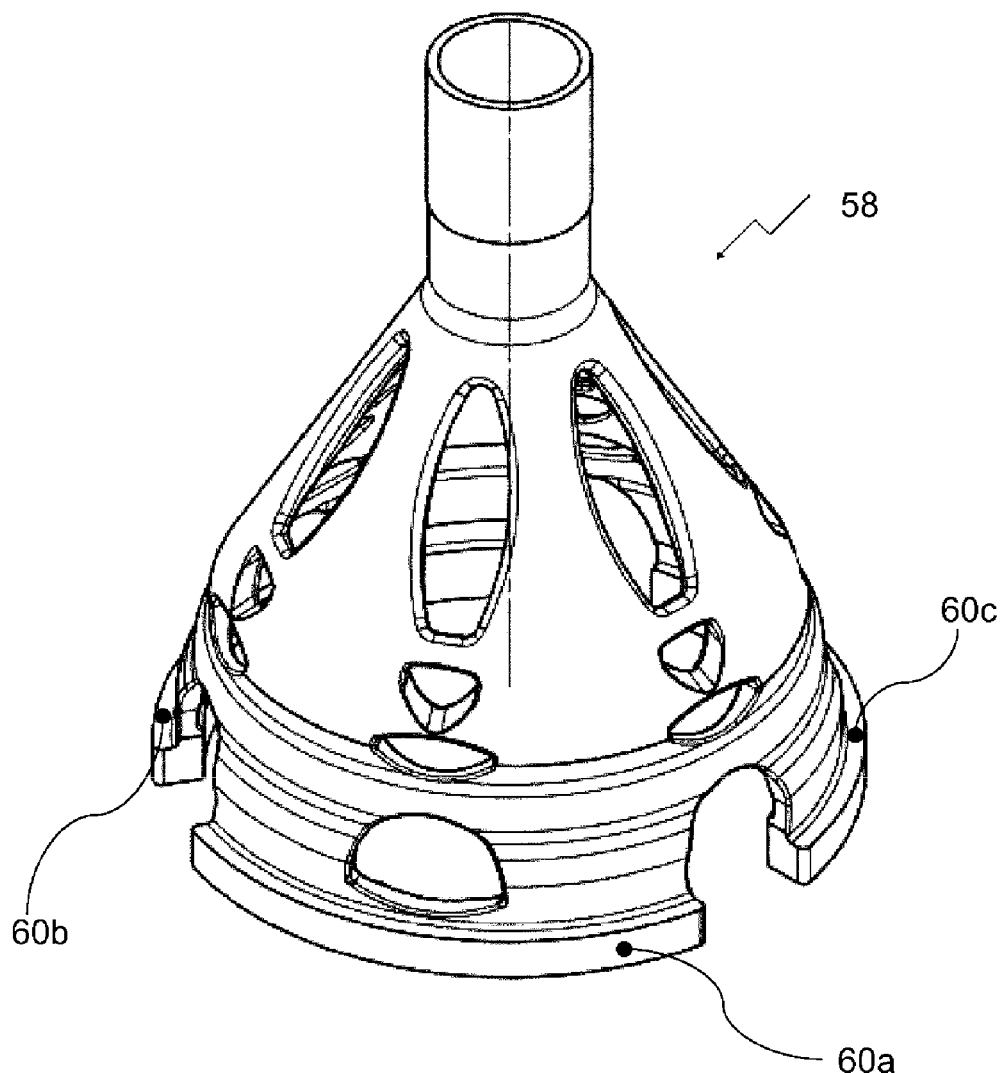
FIG. 8 shows an isometric view of a further exemplary embodiment of the die.

FIG. 8 shows an isometric view of a further exemplary embodiment of a die 58. The die 58 has a first end and a second end. At the second end thereof, the die has a fastening device 60*a*, 60*b*, 60*c*, and the die 58 is expanded to the extent that the expanded width thereof at least up to a die holder to be disposed is approximated to the latter. The fastening device 60*a*, 60*b*, 60*c* is configured to be in three parts. Furthermore, the expanded width of the die 58 is a contiguous face. The die 58 illustrated in FIG. 8 represents a bionically optimized design of high rigidity.

Figure 9:
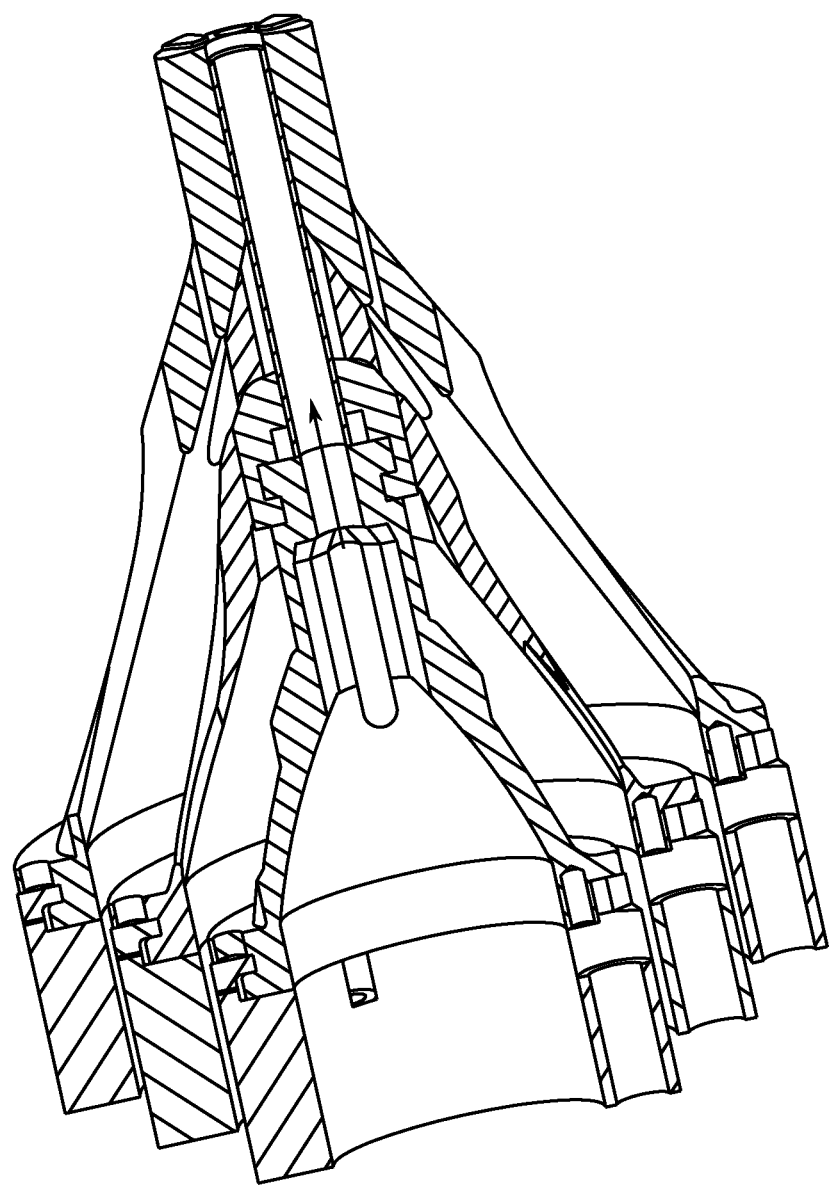
FIG. 9 shows a view of proposed mutually retracted dies of dissimilar height.

FIG. 9 shows proposed dies which are displaced in one another and which at each second end have various heights. In the terminal position illustrated this leads to dissimilar height levels being present, and to respective second ends not terminating on one plane but so as to be mutually offset. It is preferable for the height level to increase from the inside to the outside. This has the advantage of simpler assembly of the various die holders on the respective die base.

Figure 10:
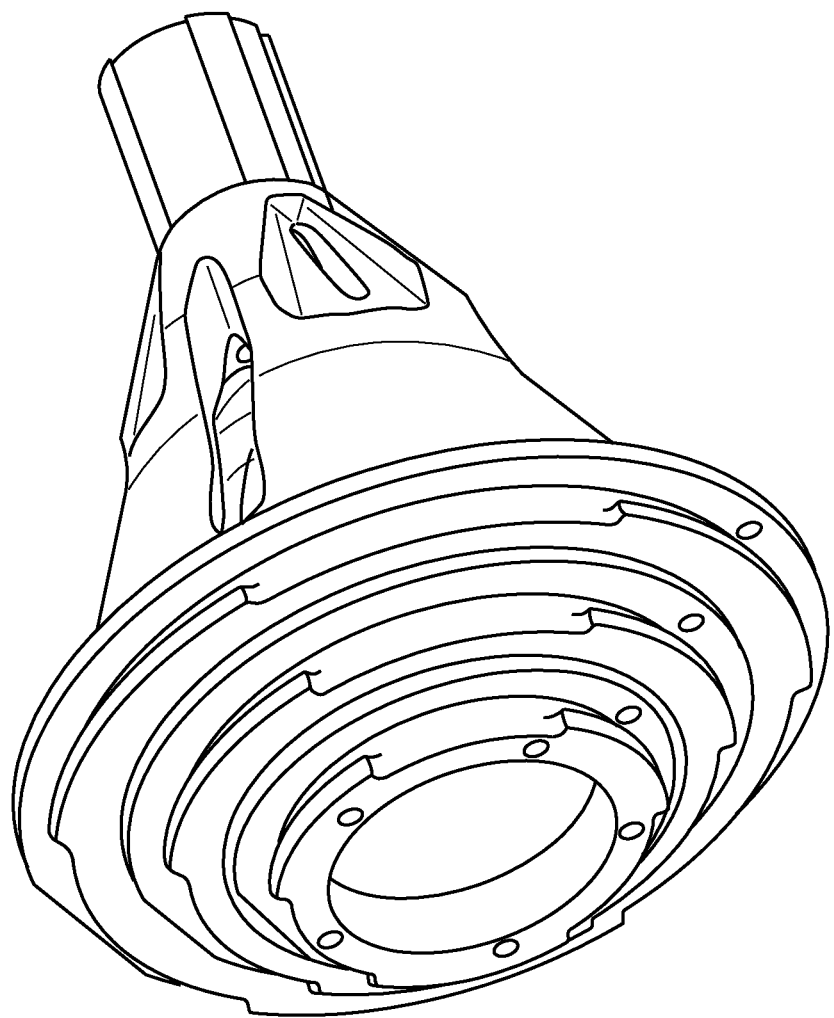
FIG. 10 shows a design embodiment of bayonet fasteners.

FIG. 10 shows the dies moving inside one another, having the respective die bases. The bayonet fasteners which were already indicated in a sectional view in FIG. 9 are elucidated herein. The bayonet fasteners are preferably aligned in such a manner that the respective die holders of various dies can be introduced and twisted in the same position. This simplifies the assembly within the press, since the operator introduces each die holder to be fastened in the same position into the press, and then twists said die holder.

Figure 11:
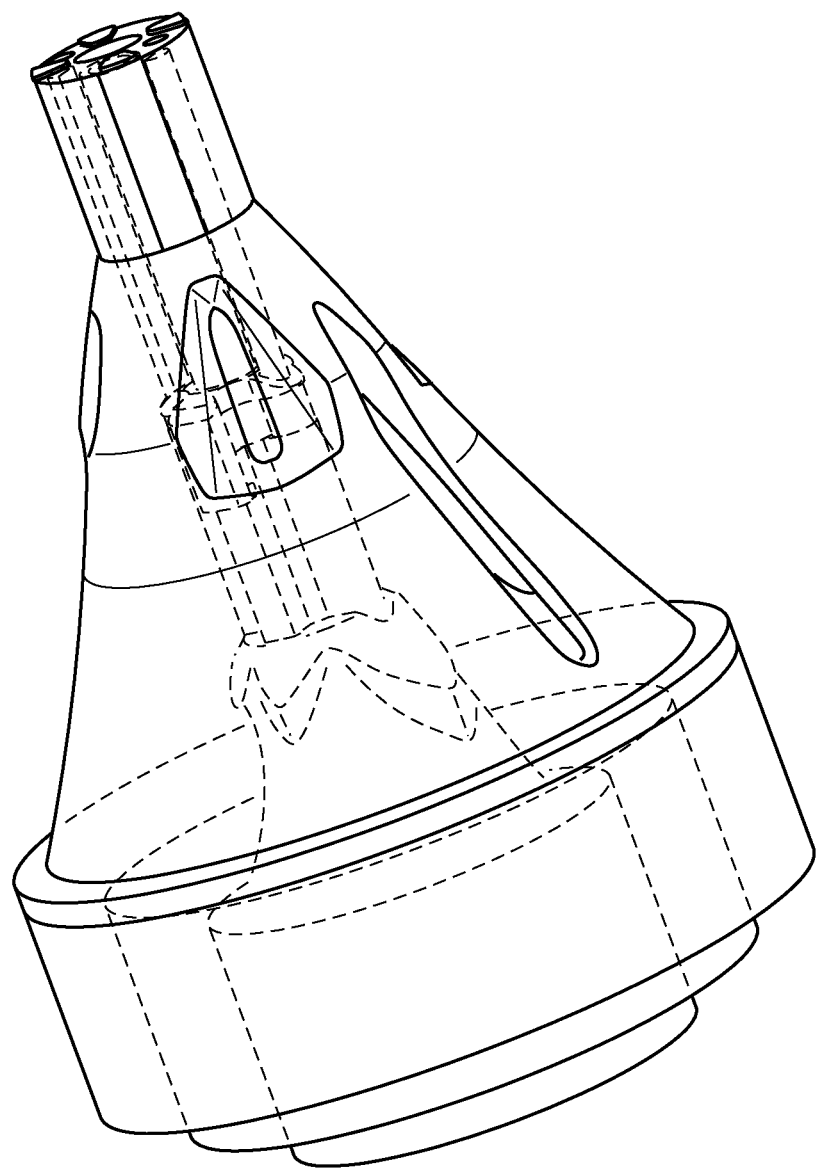
FIG. 11 shows a design embodiment corresponding to the illustration of FIG. 9.

FIG. 11 shows the dies which are derived from FIG. 9 and FIG. 10, and which are displaced in one another in a further plan view which for the sake of improved clarity uses transparent lines. It is again elucidated in this way that the individual dies are displaceable in one another, and in the terminal position of this type may have a stepped feature in the region of the die bases.

Figure 12:
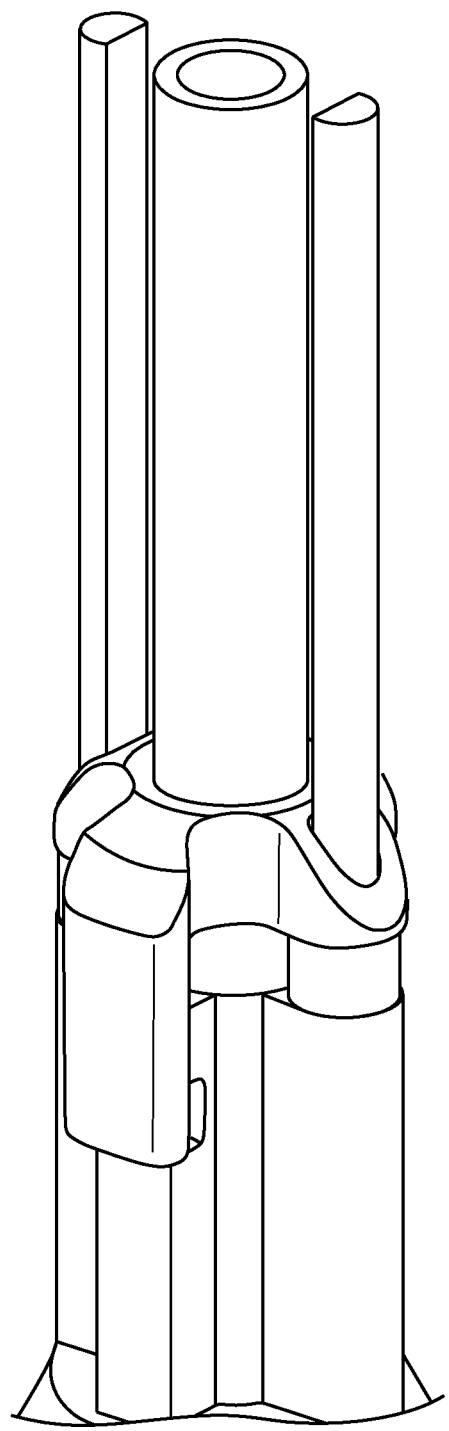
FIG. 12 shows an arrangement of a standard tool component on a proposed die holder.

FIG. 12 shows a further design embodiment in which a conventional tool element in the form of a lower die is integrated in a conically expanding construction of the die. The connection may again be performed by way of a respective closure, in particular a bayonet fastener. However, mounting the die may also be possible by way of other securing measures.

Figure 13:
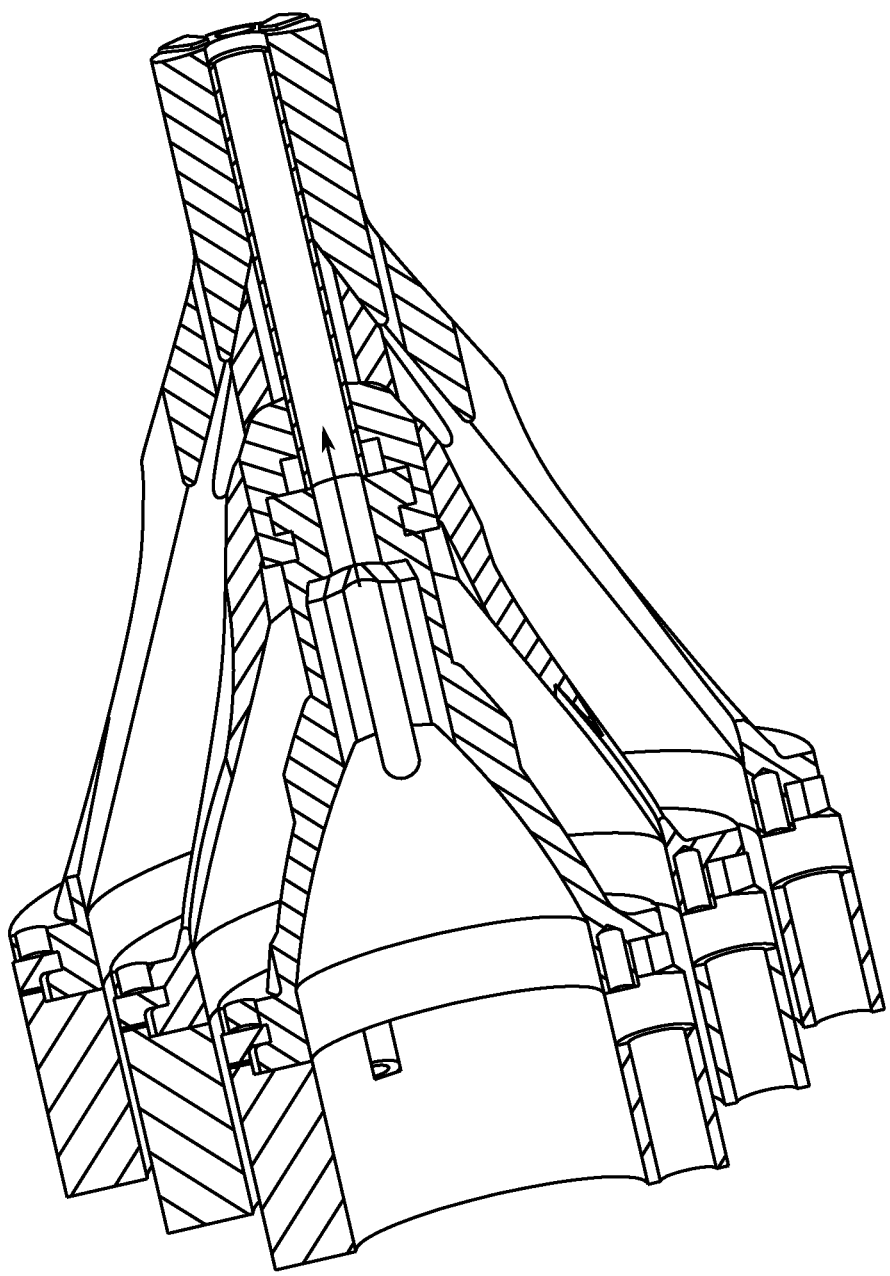
FIG. 13 shows a sectional view through an arrangement of FIG. 12.

FIG. 13 shows the connection and arrangement derived from FIG. 12, in a sectional view. Therein it is more clearly elucidated that the dies are fastened on the conically expanding extension piece by means of a bayonet fastener, for example, or else by a cap nut.

Figure 14:
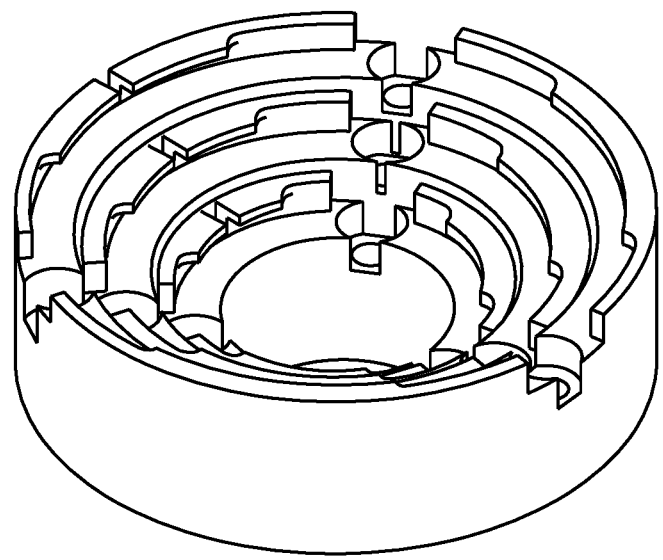
FIG. 14 shows a view of various bayonet fasteners at various height levels, in an adapter for receiving tools.

FIG. 14 shows a design embodiment of bayonet fasteners at various height levels in an adaptor for receiving tools. The respective bayonet fasteners all are preferably aligned identically, which simplifies assembly.

Figure 15:
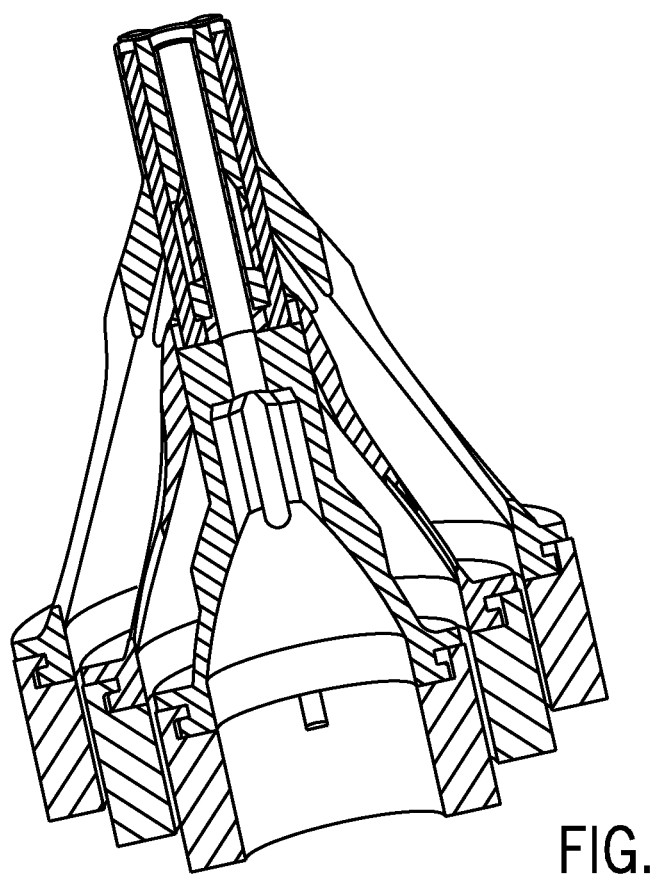
FIG. 15 shows the assembled die holders which are fastened by means of bayonet fasteners.

FIG. 15 shows the assembled die holders which are fastened by means of bayonet fasteners.

The invention claimed is:

1. A press for producing dimensionally stable preforms from substantially pulverulent material having a tool having an upper die and a lower die, wherein the upper die and the lower die each comprise at least one die, wherein a first die and a second die are conjointly disposed as the upper die or the lower die so as to slide into one another with the first die sliding within the second die, each having a first end and a second end lying opposite the first end, wherein at least one of the two dies along a portion conically expands to the extent that the second end thereof has a width with at least a portion of its outer periphery which is equal to an external diameter of a die holder which is assigned to the second end and in which the die holder has a bearing face for the second end of the die and wherein the first end of the first die and the first end of the second die are disposed in a first region and the second end of the first die and the second end of the second die are disposed in a second region and a length of the first die is within 25% of a length of the second die.

2. The press as claimed in claim 1, wherein the first die at the second end thereof is disposed directly on and bears on a first die holder, and the second die at the second end thereof is disposed directly on and bears on a second die holder, in each case without the interaction of a pressure plate.

3. The press as claimed in claim 1, wherein the first die and the second die in a pressing direction along a common longitudinal axis (c) by way of the expanded second ends of the former are disposed so as to slide into one another.

4. The press as claimed in claim 1, wherein the first die and the second die are of mutually identical or almost identical elasticity.

5. The press as claimed in claim 1, wherein in an initial position of the press, a first region (a) extends from the first end of the first die, the first end of the second die being disposed in the first region (a), and/or in that a second region (b) extends from the second end of the first die, the second end of the second die being disposed in the second region (b).

6. The press as claimed in claim 1, wherein the first die and the second die each conically expand and each have one base piece, wherein conical expansion is performed by means of a design of the die in an associated region which comprises a rotary body which is at least largely closed, a closed rotary body, a framework construction, a root-based construction, a webbed construction, and/or any other construction design which outwardly expands a die geometry.

7. The press as claimed in claim 1, wherein on a base piece at the second end of an expanded die a connection device for connecting to a component to be connected is provided.

8. The press as claimed in claim 1, wherein the first die and the second die each are produced by an additive manufacturing method.

9. The press as claimed in claim 1, wherein the first die and the second die, in each case expanded, each have a numerically conceived and load-optimized geometry of mutually matched elasticity.

10. The press as claimed in claim 1, wherein at least three or more dies are each expanded to the extent that the respective second end thereof has a width which at least approximates an external diameter of a die holder which is associated with the respective second end.

11. The press as claimed in claim 1, wherein at least one upper die and one lower die each are expanded to the extent that the respective second end thereof has a width which at least approximates an external diameter of a die holder which is associated with the respective second end.

12. The press as claimed in claim 1, wherein the tool further comprises a template having an opening wherein the upper die enters the template from a first template side and the lower die enters the template from a second template side which is opposite the first template side to accommodate pressing of the pulverulent material inside the template.

13. The press as claimed in claim 1, wherein the first die and the second die are nested such that the first die and the second die are mutually telescopic.

14. The press as claimed in claim 1, wherein the length of the first die is within 10% of the length of the second die.

15. A method for producing a dimensionally stable preform from substantially pulverulent material, using the press of claim 1, the method comprising the following steps:
    filling a pulverulent material into an opening of a template,
    pressing the pulverulent material in the template, wherein the pulverulent material on a first template side is compressed by the upper die and from a second template side, which is opposite the first template side, by the lower die including the first die and the second die, wherein the first die and the second die slide into one another with the first die sliding within the second die and are each connected to the die holder assigned thereto, wherein a pressing power from the first end of a respective one the first die and the second die is directed along the respective one of the first die and the second die to the second end of the respective one of the first die and the second die so far outward that on the die holder which is associated with the respective one of the first die and the second die a force vector which acts in the movement direction of the respective one of the first die and the second die acts without modification from the respective one of the first die and the second die on the die holder associated therewith and
    demolding the preform from the template.

16. The method as claimed in claim 15, wherein uniform relaxation of the preform for avoiding stress cracks in the preform is performed by the lower die including the first and second dies and/or the upper die.

17. The method as claimed in claim 15 wherein the lower die including the first die and the second die cause uniform relaxation and demolding of the pulverulent material.

18. The method as claimed in claim 15, wherein the first die and the second die of the lower die act by way of approximately identical elasticity on the preform.

* * * * *

UNITED STATES PATENT AND TRADEMARK OFFICE
CERTIFICATE OF CORRECTION

| | |
|---|---|
| PATENT NO. | : 11,278,962 B2 |
| APPLICATION NO. | : 15/126769 |
| DATED | : March 22, 2022 |
| INVENTOR(S) | : Rainer Schmitt et al. |

It is certified that error appears in the above-identified patent and that said Letters Patent is hereby corrected as shown below:

In the Specification

Column 2, Line 42, "byway" should be --by way--.

Column 3, Line 34, "byway" should be --by way--.

Column 6, Line 20, "byway" should be --by way--.

Column 9, Line 43, "byway" should be --by way--.

Column 9, Line 56, "byway" should be --by way--.

Column 10, Line 21, "byway" should be --by way--.

Column 13, Line 55, "byway" should be --by way--.

Column 14, Line 2, "byway" should be --by way--.

Signed and Sealed this
Fourteenth Day of June, 2022

Katherine Kelly Vidal
*Director of the United States Patent and Trademark Office*